US012253469B2

(12) United States Patent
Liu et al.

(10) Patent No.: US 12,253,469 B2
(45) Date of Patent: Mar. 18, 2025

(54) SYSTEMS AND METHODS FOR IMPROVED LIGHT-SHEET MICROSCOPY

(71) Applicant: Case Western Reserve University, Cleveland, OH (US)

(72) Inventors: Yehe Liu, Cleveland, OH (US); Michael Jenkins, Cleveland, OH (US)

(73) Assignee: CASE WESTERN RESERVE UNIVERSITY, Cleveland, OH (US)

( * ) Notice: Subject to any disclaimer, the term of this patent is extended or adjusted under 35 U.S.C. 154(b) by 426 days.

(21) Appl. No.: 17/626,328

(22) PCT Filed: Jul. 16, 2020

(86) PCT No.: PCT/US2020/042212
§ 371 (c)(1),
(2) Date: Jan. 11, 2022

(87) PCT Pub. No.: WO2021/011709
PCT Pub. Date: Jan. 21, 2021

(65) Prior Publication Data
US 2022/0269058 A1  Aug. 25, 2022

Related U.S. Application Data

(60) Provisional application No. 62/936,757, filed on Nov. 18, 2019, provisional application No. 62/874,688, filed on Jul. 16, 2019.

(51) Int. Cl.
*G02B 21/36* (2006.01)
*G01N 21/64* (2006.01)
(Continued)

(52) U.S. Cl.
CPC ........... *G01N 21/6458* (2013.01); *G02B 7/08* (2013.01); *G02B 21/082* (2013.01); *G02B 21/16* (2013.01);
(Continued)

(58) Field of Classification Search
CPC ....... G01N 21/6458; G01N 2021/6439; G01N 2201/0221; G01N 2201/0621;
(Continued)

(56) References Cited

U.S. PATENT DOCUMENTS 7,051,445 B1    5/2006 Karapetyan
9,625,387 B2    4/2017 Demos et al.
(Continued)

FOREIGN PATENT DOCUMENTS

CN    109060740 A  * 12/2018
JP    2019045783 A    3/2019

OTHER PUBLICATIONS

Translation of CN 109060740 A (Year: 2018).*
(Continued)

*Primary Examiner* — Dani Fox
*Assistant Examiner* — Mamadou Faye
(74) *Attorney, Agent, or Firm* — Tarolli, Sundheim, Covell & Tummino LLP

(57) ABSTRACT

Described herein are systems and methods for improving light-sheet microscopy with cost-effective and simplified components. Such cost-effective and simplified components can be implemented in a light focusing system, a light generation system, and/or in imaging system. The light focusing system can be improved by attaching a voice coil motor to a focusing lens to increase the imagable field of view. The light generation system can be improved with a multimode laser diode to increase the uniformity of the beam profile and to increase the usable optical power. The imaging system can be improved by using a fluid chamber with positive cylindrical optical window for minimizing spherical aberrations.

24 Claims, 25 Drawing Sheets

(51) Int. Cl.
*G02B 7/08* (2021.01)
*G02B 21/08* (2006.01)
*G02B 21/16* (2006.01)
(52) U.S. Cl.
CPC ........... *G02B 21/36* (2013.01); *G02B 21/361* (2013.01); *G02B 21/367* (2013.01); *G02B 21/368* (2013.01); *G01N 2021/6439* (2013.01); *G01N 2201/0221* (2013.01); *G01N 2201/0621* (2013.01)
(58) Field of Classification Search
CPC .. G01N 21/648; G01N 2201/062; G02B 7/08; G02B 21/082; G02B 21/16; G02B 21/36; G02B 21/361; G02B 21/367; G02B 21/368; G02B 13/143; G02B 21/0008; G02B 21/0032; G02B 21/0076; G02B 21/34; G03B 17/565; H04N 23/55; H04N 23/56
See application file for complete search history.

(56) References Cited

U.S. PATENT DOCUMENTS

| | | | |
|---|---|---|---|
| 9,964,489 B2 | 5/2018 | Levenson et al. | |
| 2007/0115455 A1* | 5/2007 | Ilev | G01P 5/22 356/28 |
| 2015/0362713 A1* | 12/2015 | Betzig | G02B 21/006 250/459.1 |
| 2016/0124203 A1* | 5/2016 | Ryu | G02B 21/06 359/385 |
| 2016/0327799 A1* | 11/2016 | Hoellwarth | G06F 1/1632 |
| 2017/0139193 A1* | 5/2017 | Iguchi | G02B 15/00 |
| 2019/0204577 A1* | 7/2019 | Faris | G02B 21/0088 |

OTHER PUBLICATIONS

Xiang et al. "High-resolution light-sheet microscopy: a simulation of an optical illumination system for oil-immersion", Optical Systems Design 2015: Optical Design and Engineering VI, SPIE vol. 9626 p. 9626I-1-9626I-12. (Year: 2015).*

Javier "Laser and Gaussian Beam Propagation and Transformation", Encyclopedia of Optical Engineering, Marcel Dekker, Inc. p. 999-1013 (Year: 2003).*

Manish et al. "Low-cost light-sheet microscopy for whole brain imaging" Three-Dimensional and Multidimensional Microscopy: Image Acquisition and Processing XXV, Proc. od SPIE vol. 10499, 2018, p. 1049911-1-1049911-6 (Year: 2018).*

Han, Jefferson Y. "Low-cost multi-touch sensing through frustrated total internal reflection." Proceedings of the 18th annual ACM symposium on User interface software and technology. 2005.

Gareau, Daniel S. "Feasibility of digitally stained multimodal confocal mosaics to simulate histopathology." Journal of biomedical optics 14.3 (2009): 034050.

Switz, Neil A., Michael V. D'Ambrosio, and Daniel A. Fletcher. "Low-cost mobile phone microscopy with a reversed mobile phone camera lens." PloS one 9.5 (2014): e95330.

International Search Report for corresponding Application Serial No. 2020042212.

Anonymous: "L462P1400MM Specification Sheet", Jan. 1, 2017 (Jan. 1, 2017), XP055758280, Retrieved from the Internet <URL:https://www.thorlabs.de/drawings/f3f33101365795dd-C6A06889-C589-6060-606A175D78A57289/L462P1400MM-SpecSheet.pdf> [retrieved on Dec. 9, 2020].

Kumar M, Kishore S, Nasenbeny J, McLean DL, Kozorovitskiy Y. Integrated one- and two-photon scanned oblique plane illumination (SOPi) microscopy for rapid volumetric imaging. Opt Express. May 14, 2018;26(10): 13027-13041. doi: 10.1364/OE.26.013027. PMID: 29801336; PMCID: PMC6005676.

Ping J, Zhao F, Nie J, Yu T, Zhu D, Liu M, Fei P. Propagating-path uniformly scanned light sheet excitation microscopy for isotropic volumetric imaging of large specimens. J Biomed Opt. Aug. 2019;24(8):1-5. doi: 10.1117/1.JBO.24.8.086501. PMID: 31385482; PMCID: PMC6983483.

Wolf, Sébastien, and Georges Debrégeas. "fast volumetric imaging using light-sheet microscopy. Principles and applications." (2018): 1-24.

Saghafi S, Becker K, Hahn C, Dodt HU. 3D-ultramicroscopy utilizing aspheric optics. J Biophotonics. Jan. 2014;7(1-2):117-25. doi: 10.1002/jbio.201300048. Epub Jul. 17, 2013. PMID: 23861302.

Lukes, Sarah. "Dynamic and Agile Focusing in Microscopy." SPIE, 2016.

Kumar, Manish, Jordan Nasenbeny, and Yevgenia Kozorovitskiy. "Low cost light-sheet microscopy for whole brain imaging." Three-Dimensional and Multidimensional Microscopy: Image Acquisition and Processing XXV. vol. 10499. SPIE, 2018.

* cited by examiner

21. Collimated Light Source
22. VCM Driven Cylindrical Lens
23. Detection Optics
24. Sheet Region (VCM Off)
25. Extended Sheet Region (VCM On)

SYSTEMS AND METHODS FOR IMPROVED LIGHT-SHEET MICROSCOPY

CLAIM OF PRIORITY

This application claims priority to U.S. Provisional Application Ser. No. 62/874,688, filed Jul. 16, 2019, entitled "Improved Microscopy Devices, Systems, and Methods" and to U.S. Provisional Application Ser. No. 62/936,757, filed Nov. 18, 2019, entitled "Systems and Methods for Improved Light-sheet microscopy". The entirety of these provisional applications is hereby incorporated by reference for all purposes.

TECHNICAL FIELD

The present disclosure relates to light-sheet microscopy, more specifically, to systems and methods for improved light-sheet microscopy.

BACKGROUND

Light-sheet microscopy, also referred to as light-sheet fluorescence microscopy, selective/single plane illumination microscopy, or ultramicroscopy, is an emerging light microscopy technique that can be used in biomedical research for 3D fluorescence imaging of a sample. The basic principal of light sheet microscopy is to illuminate the sample with a light sheet at the focal plane of the detection objective. Only the fluorophores within the light sheet are excited and imaged through a fluorescence microscope, generating better optical sectioning than epi- or trans-luminescence fluorescence microscopy, and faster imaging speed than confocal microscopy (causing much less photobleaching to the sample).

While light-sheet microscopy is very attractive as a fluorescence microscopy technique, conventional high-resolution light-sheet microscopes are fundamentally flawed. Conventional light-sheet microscopes are expensive, complicated to set up and operate successfully, with a field of view that is limited by properties of the light sources required to achieve decent resolutions.

SUMMARY

Provided herein are systems and methods for improved light-sheet microscopy.

In one aspect, the present disclosure includes a system that improves light-sheet microscopy using a voice coil motor to move a focusing lens (referred to as a lens). The system includes a lens configured to focus a light beam (having a beam profile comprising zero or higher Gaussian characteristics) in one dimension into a focal sheet (or "light sheet") within a focal plane of an imaging device. The system also includes a voice coil motor configured to move the lens along an axis of the light beam, causing a change in a position of the light sheet within the focal plane of the imaging device.

In another aspect, the present disclosure includes a system that improves light-sheet microscopy by enhancing light generation with a multimode laser diode. The system includes the multimode laser that outputs a light beam with a high order Hermite-Gaussian mode (e.g., a Hermite polynomial of a Gaussian function of a beam profile of the light beam has an index equal to zero in one dimension and greater than zero in another dimension). The system also includes a collimating lens configured to collimate the light beam and a lens configured to focus the collimated light beam into a light sheet. An imaging device provides an imaging focal plane and captures data when the light sheet passes through a sample in the imaging focal plane.

In yet another aspect the present disclosure includes a method for improves light-sheet microscopy with a better sample holder that includes a positive cylindrical optical window to minimize spherical aberrations. The method includes obtaining a translucent biological sample; immersing the translucent biological sample in a medium; and placing the translucent biological sample immersed in the medium within a fluid chamber of a microscope. The fluid chamber includes the positive cylindrical optical window and the sample holder that can secure the translucent biological sample immersed in the medium. The method also includes generating, by a light generation system, a collimated light beam that is focused in a direction of the fluid chamber; and focusing by lens (either a cylindrical lens or an acylindrical lens), the collimated light beam to pass through the positive cylindrical optical window as a thin light sheet that is located within the translucent biological sample.

BRIEF DESCRIPTION OF THE DRAWINGS

The foregoing and other features of the present disclosure will become apparent to those skilled in the art to which the present disclosure relates upon reading the following description with reference to the accompanying drawings, in which.

DETAILED DESCRIPTION

I. Definitions

Figure 1:
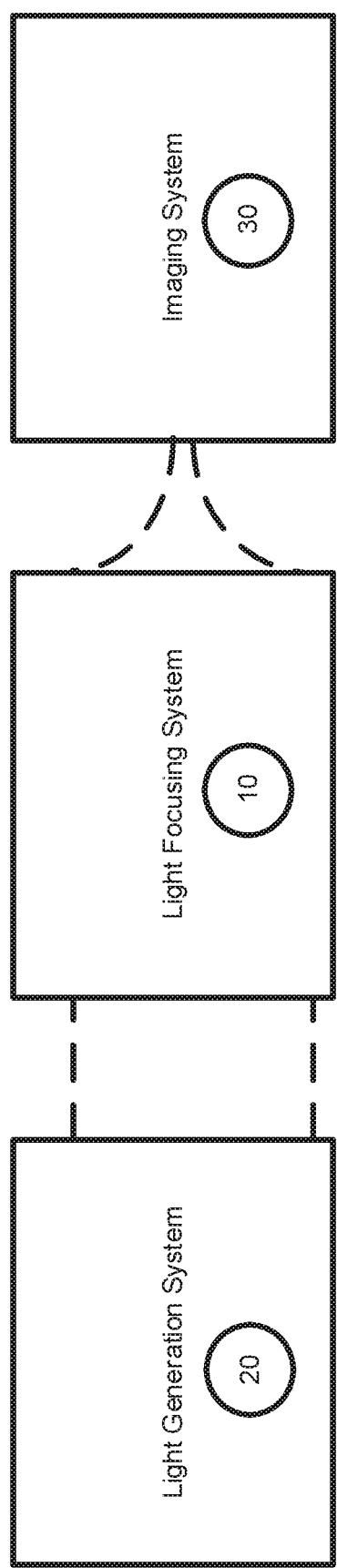
FIG. 1 is a diagram showing three cost effective improvements that can each individually improve light-sheet microscopy.

Unless otherwise defined, all technical terms used herein have the same meaning as commonly understood by one of ordinary skill in the art to which the present disclosure pertains.

As used herein, the singular forms "a," "an" and "the" can also include the plural forms, unless the context clearly indicates otherwise.

As used herein, the terms "comprises" and/or "comprising," can specify the presence of stated features, steps, operations, elements, and/or components, but do not preclude the presence or addition of one or more other features, steps, operations, elements, components, and/or groups.

As used herein, the term "and/or" can include any and all combinations of one or more of the associated listed items.

As used herein, the terms "first," "second," etc. should not limit the elements being described by these terms. These terms are only used to distinguish one element from another. Thus, a "first" element discussed below could also be termed a "second" element without departing from the teachings of the present disclosure. The sequence of operations (or acts/steps) is not limited to the order presented in the claims or figures unless specifically indicated otherwise.

As used herein, the term "imaging" can refer to methods and technologies for visualizing and examining structures not observable with the naked eye. One example type of imaging is medical imaging, in which visual representations of anatomical structures and biological samples are created for diagnostic, treatment, or research purposes.

As used herein, the term "microscope", also referred to as an optical microscope or a light microscope, can refer to an instrument that uses light and one or more lenses to generate magnified images of a sample.

As used herein, the term "microscopy" can refer a type of imaging that examines a sample using a microscope. Types of microscopy can include, for example, bright field microscopy, confocal microscopy, fluorescence microscopy, and light sheet microscopy.

As used herein, the term "light sheet microscopy" can refer to a fluorescence microscopy technique that illuminates a thin slice of a sample perpendicular to the direction of observation with a light beam focused in only one direction (e.g. using a lens). Light sheet microscopy can have intermediate-to-high optical resolution, good optical sectioning capabilities, and high speed.

As used herein, the term "fluorescence microscopy" can refer to a technique that utilizes fluorescence instead of, or in addition to, scattering, reflection, and attenuation or absorption.

As used herein, the term "lens" can refer to one or more pieces of glass or other transparent substance with curved sides for concentrating or dispersing light. When used herein, a "lens" can refer to a cylindrical or an acylindrical lens positioned and otherwise configured to focus a light beam into a focal sheet and may be a single lens or a compound lens. Other types of lenses can exist and will be named accordingly, like a "collimating lens", an "objective lens", a "tube lens", or the like.

As used herein, the term "cylindrical lens" can refer to a type of lens that focuses light into a line (e.g., a focal sheet, a light sheet, or the like) rather than a point. The cylindrical lens has a curved face or faces that are sections of a cylinder and focus light passing through into one dimension—a line parallel to the intersection of the surface of the lens and a tangent plane.

As used herein, the term "acylindrical lens" can refer to the cylindrical counterpart to an aspheric lens that can combine the aberration-reducing benefits of an aspheric surface with the one-dimensional focusing of a standard cylindrical lens As used herein, the terms "collimating lens", "collimator" or "collimating optics" can refer to a device (e.g., including at least one pieces of glass or other transparent substance configured to reflect, concentrate or disperse light) that narrows a light beam by causing the directions of motion of the light beam to become more aligned in a specific direction, (e.g., more parallel). As an example, the collimating lens can be a single aspherical lens, a spherical achromatic doublet, a compound lens, or the like.

As used herein, the term "focal length" can refer to a distance between the optical center of the lens to its focal point.

As used herein, the term "objective lens" can refer to a lens within an optical system that is located closest to the sample. The objective lens can be a compound lens and/or be part of a compound lens.

As used herein, the term "tube lens" can refer to a lens placed between an objective lens and an eyepiece of a microscope to produce an intermediate image.

As used herein, the terms "beam profile" or "light beam profile" can refer to a two-dimensional spatial intensity plot of a light beam at a given location along a path of the light beam.

As used herein, the terms "voice coil motor (VCM)" and "coil motor" can refer to a type of direct drive linear motor. Generally, a VCM can include a permanent magnetic field assembly and a coil assembly. Current flowing through the coil assembly interacts with the permanent magnetic field and generates a force vector perpendicular to the direction of the current flow. As an example, the VCM can have a travel range from 100 m to 7 mm.

As used herein, the term "light" can refer to electromagnetic radiation of a wavelength from 350 nm to 1800 nm. The light can be coherent (with waves maintaining a fixed and predictable phase relationship over a period of time) or non-coherent (with amplitude and/or phase characteristics that fluctuate randomly in space and time).

As used herein, the term "imaging device" can refer to an instrument capable of recording, storing, and/or transmitting visual images. As an example, the imaging device can have one or more of a compound objective lens, an optical filter, a tube lens, and/or an image sensor (e.g., a CCD camera, a CMOS camera, any device with a rolling shutter, or the like). As another example, the imaging device can be a microscope. The imaging device can establish a focal plane that a light sheet can pass through; as an example, the compound objective lens can define the focal plane and the image sensor can collect data from the light sheet passing through the focal plane.

As used herein, the term "multimode laser diode" can refer to a semiconductor device that can directly convert electrical energy into light with an optical cavity that has a wide waveguide in the transverse direction compared to the wavelength of the light produced by the laser diode. The waveguide can support multiple transverse optical modes.

As used herein, the term "sample" can refer to a small part used for testing or examination to show what the whole is like. For example, the sample can be a biological sample, in which the whole is an organic material, such as blood, interstitial fluid, tissue, bone, etc.

As used herein, the term "optical window" can refer to a piece of transparent for the optical wavelength used) optical material that allows light into an optical instrument.

As used herein, the term "numerical aperture" can refer to a dimensionless number that characterizes the range of angles over which light can be accepted or emitted.

As used herein, the term "f-number" can refer to the ratio of focal length to a diameter of a lens. The f-number is a dimensionless number.

II. Overview

Light-sheet microscopy can be used in biomedical research for 3D fluorescence imaging of a sample. Light-sheet microscopy provides better optical sectioning than epi- or trans-luminescence fluorescence microscopy and faster imaging speed than confocal microscopy. While light-sheet microscopy is very attractive as a fluorescence microscopy technique, light-sheet microscopy has not been adopted to great extent in the biomedical research community. The wide-spread use of light-sheet microscopy may be hampered be expense, complexity, and/or resolution.

The systems and methods described herein can eliminate one or more barriers hampering wide-spread use of light-sheet microscopy in the biomedical research community. These systems and methods can use simple and cost-effective components to reduce the expense, complexity, and/or resolution of light-sheet microscopy, thereby increasing the accessibility of light-sheet microscopy. As shown in FIG. 1, improvements can be made to a light sheet microscope within a light focusing system 10, a light generation system 20, and/or an imaging system 30.

III. Improving the Light Focusing System 10: Voice Coil Motor Driven Lens

Conventional light-sheet microscopy has a field of view that is often limited by a size of the light sheet. The size of the light sheet is determined by the Rayleigh range of the focused light beam in the direction that the light beam is propagating. In order to generate a thinner light sheet, conventional light-sheet microscopes obtain sharper focusing though small f-number or high numerical aperture lenses. However, this also reduces the width of the light sheet. Conventional light-sheet microscopes mediate the width problem by scanning the focus of the light beam rapidly along the axial direction of the light beam. However, this scanning solution often requires a sophisticated and expensive optical setup.

Figure 2:
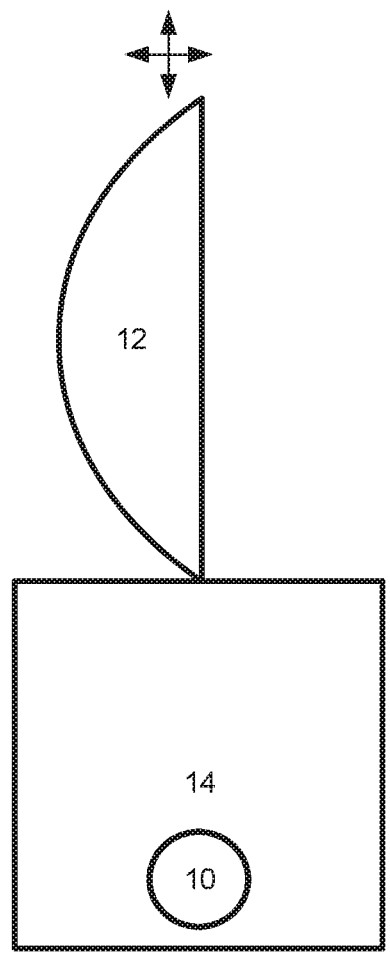
FIG. 2 is a diagram showing an example light focusing system that can improve light-sheet microscopy.

One aspect of the present disclosure can include an improvement to a light focusing system 10. The scanning of the light focusing system 10 is improved using a voice-coil motor 14 driven lens 12 (e.g., a focusing lens), as shown in FIG. 2. The voice-coil motor driven lens of the system 10 reduces the cost and improves the performance of light-sheet microscopes.

A. System

As shown in FIG. 2, the light focusing system 10 can include a lens 12 and a voice coil motor (VCM) 14. The lens 12 and VCM 14 provide a simple and robust optical setup to generate a thin light beam. The lens 12 can be small, having a small f-number and/or a large numerical aperture. For example, the lens 12 can be of a weight small enough so that the VCM 14 can be inexpensive (e.g., a VCM frequently used in autofocusing mobile phone cameras) and still capable of achieving the required scanning. The lens 12 and VCM 14 can provide a solution that is more than 100 times more inexpensive than traditional solutions that use a linear actuator or a piezo scanner.

The lens 12 of the light focusing system 10 can receive a light beam that has been collimated (light generation system and collimator not shown). The lens 12 can focus the collimated light beam in one dimension at the focal point of the lens 12 as a light sheet. The ability of the lens 12 to focus the collimated light beam in one dimension is due at least in part to the collimation. By moving the lens 12, the VCM 14 can allow the light sheet to have a larger field of view. It should be noted that the collimator, the lens 12, and/or the VCM 14 can be of a small size so not to be cumbersome for light-sheet microscopy applications.

The lens 12 can be attached to the VCM 14 by any common attachment mechanism (i.e., an adhesive, a mounting, a clamp, etc.). For example, the lens 12 can be attached to the VCM 14 in any way that allows linear motion of the lens 12 (e.g., the linear motion can be in at least one direction, at least two directions, at least three directions, etc.). The lens 12 can be configured to focus a light beam into a focal sheet (or "light sheet") within a focal plane of an imaging device (e.g., any imaging device with an image sensor (e.g., having a CCD camera, a CMOS camera, a rolling shutter, etc.), such as a microscope, not shown in FIG. 2). The lens 12 can focus the light beam (having zero or higher order Gaussian characteristics) in one dimension. For example, the lens can be a cylindrical lens or an acylindrical lens that is a single element lens or a compound lens.

The VCM 14 can be configured to drive the lens 12 to move along an axis of the light beam. For example, the VCM 14 can have a travel range from 100 μm to 7 mm. Moving the lens 12 causes a change in a position of the light sheet within the focal plane of the imaging device. In other words, the VCM 14 moving the lens 12 causes the lens 12 to focus the light beam to different positions within a focal plane of the imaging device. By driving the lens 12, the VCM 14 can improve the field of view of a light-sheet microscope in a simplified and cost-effective manner, without sacrificing higher resolution images.

As noted, the VCM 14 can be configured to drive the lens 12 to move in any linear direction (e.g., along an axis of the light beam) to cause a change in position of the light sheet within the focal plane of the imaging device. In some instances, the VCM 14 can be configured to vibrate the lens 12. The vibration can occur at a frequency from 10 to 100

Hz. The movement of the VCM 14 can be manually controlled or automatically controlled by a processor and non-transitory memory (not shown) in wired or wireless connection with the VCM 14.

Figure 3:
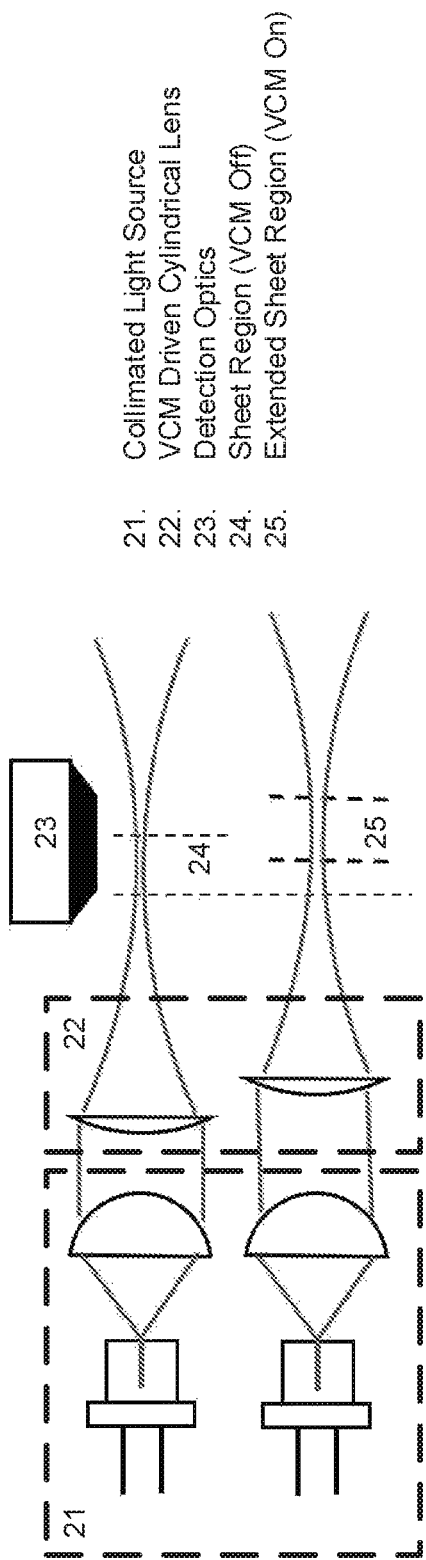
FIG. 3 is a diagram showing an experimental setup including the system of FIG. 2.

FIG. 3 shows an experimental setup using the light focusing system 10 with the VCM driven cylindrical lens 22. A collimated light source 21, that includes a light source (e.g., a laser diode, such as a multimode laser diode), an emitting layer, and collimating optics (illustrated here as a collimating lens), which produces a collimated light beam. The experimental setup can also include detection optics 23.

In the upper example, the VCM driven cylindrical lens 22 can be in a first position (e.g., the VCM can be off). The collimated light beam is focused by the VCM driven cylindrical lens 22 into a light sheet. The light sheet passes through at least a portion of a sample in a sheet region 24 of the detection optics 23.

In the lower example, the VCM can drive the cylindrical lens (the VCM drive cylindrical lens 22) to a second position. With the cylindrical lens in the second position, the light sheet can pass through at least another portion of the sample in an extended sheet region 25 of the detection optics 23 when the VCM is on and the VCM driven cylindrical lens 22 is in a second position. The VCM cylindrical lens 22 can have any number of positions creating multiple extended sheet regions and is not limited to two positions.

Figure 4:
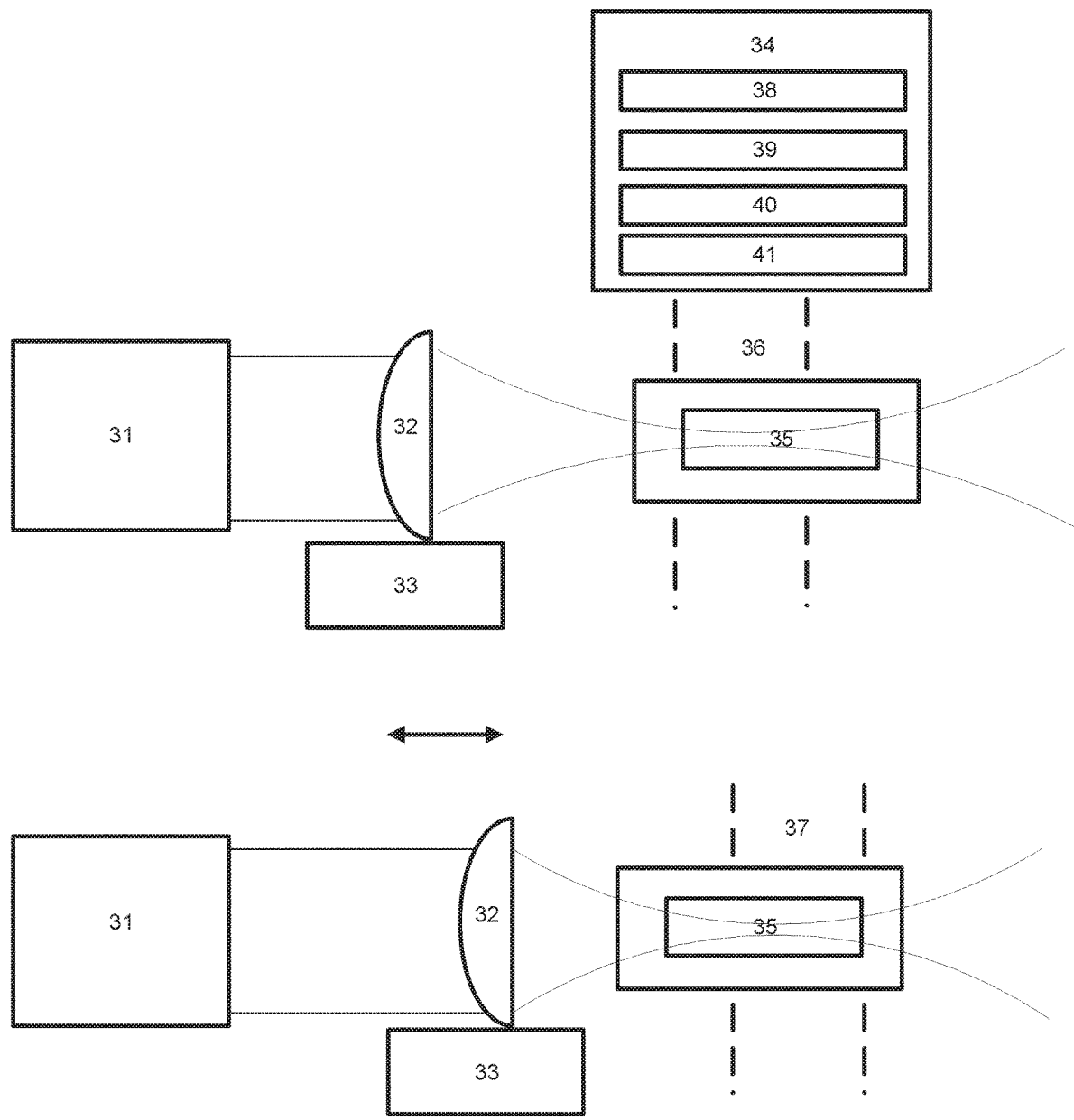
FIG. 4 is a diagram showing a detailed example of the system of FIG. 2 used for light-sheet microscopy.

Shown in FIG. 4 is a detailed example of the light focusing system 10 (including the lens 32 attached to the voice coil motor 33) configured with other components to perform light-sheet microscopy. The other compounds can include at least a light generation system 31, a sample 35, and/or an imaging system 34. Additionally, the top figure shows the light focusing system 10 in a first position, while the bottom figure shows the light focusing system 10 in a second position.

The light generation system 31 provides the collimated light beam that is focused through the lens 32 attached to VCM 33. The Rayleigh length of the focused light beam is between 10 µm and 500 µm. The lens 32 focuses the light beam in one dimension into a focal sheet, which is a light sheet. An imaging device 34 is positioned orthogonal/perpendicular to the light sheet. The light sheet passes through a sample 35 in an imaging focal plane 36 of the imaging device 34 at a first distance. The imaging device 34 is configured to detect fluorescence when the light sheet passes through the sample 35. The imaging device 34 is configured to capture data as the light sheet passes through the sample 35 in the imaging focal plane 36. The VCM 33 is configured to move the lens 32 and has a travel range between 100 µm and 7 mm. When the VCM 33 moves the lens 32, shown in FIG. 3 as linear movement to the right (however the lens can be moved in other linear directions (i.e., left, right, up, down, etc. depending on the positioning of the VCM)), the position of the light sheet within the imaging focal plane 36 changes to intersect an extended imaging focal plane 37 of the imaging device. The change in position of the light sheet to pass through the extended imaging focal plane 37 is proportional to the change in position of the lens 32. The extended imaging focal plane 37 creates a larger field of view for the imaging device 34, thereby allowing a larger sample to be imaged with light-sheet microscopy without moving the imaging device 34 or the sample 35 itself.

The light generation system 31 can comprise a coherent light source (such as a laser diode, a laser, or the like) or a non-coherent light source (such as an LED, an incandescent light bulb, a candle, or the like). The light generation system 31 can be configured to generate a light beam with a wavelength between 350 nm and 1800 nm. The light generation system collimates the light beam, with a collimating optics (lens), before the light beam is emitted towards the lens 32.

The imaging device 34 can include one or more of a compound objective lens 38 (e.g., oriented such that the focal plane is orthogonal to the light sheet), an optical filter 39, a tube lens 40, and/or an image sensor 41 (e.g., configured to capture data when the light sheet passes through the sample in the imaging focal plane). The compound objective lens 38 is oriented such that the focal plane of the compound objective lens is orthogonal to the light sheet. The compound objective lens can have a field of view between 200 µm and 10 mm diagonally. The image sensor 41 is configured to capture data from the sample when the light sheet passes through the sample in the imaging focal plane 36 and the extended imaging focal plan 37 when the VCM 33 moves the lens 32. The captured data is preferably high-resolution data. The captured data can be viewed in two-dimensions or three-dimensions (as Z-stacks of the 2D data). The captured data can be displayed, post processed, and analyzed on a display with a processor and non-transitory memory in wired or wireless connection with the imaging device 34 using imaging software (such as ImageJ). The image sensor 41 can be a CCD (charge-coupled device) camera, a CMOS (complementary metal oxide semiconductor) camera, or the like. The image sensor 41 can have a rolling shutter to capture each frame by scanning across the sample either vertically or horizontally (or any other type of shutter).

In one example, the imaging device 34 can be a microscope, preferably a fluorescence microscope, and the light focusing system 10 and the other components shown in FIG. 4 can be appended to the existing microscope to create a light-sheet microscope. VCM are often used for autofocusing mobile phone cameras and security cameras and are small and inexpensive as a result. The light focusing system 10 can utilize a commercially available small VCM and can be as small as 20×20×20 mm, custom components can bring the light focusing system's 10 size down to 10×10×5. Because of its small size, the light focusing system 10 can be easily integrated into the sample stage of an existing conventional fluorescent microscope without major structural modifications.

Figure 5:
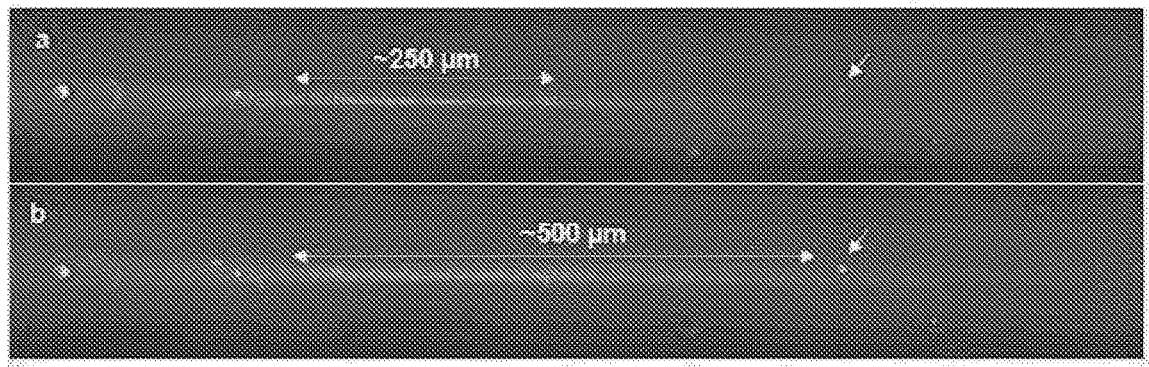
FIG. 5 is two images comparing the field of view of a conventional light-sheet microscope and the field of view of a light-sheet microscope using the system of FIG. 2.

FIG. 5 shows images of an exemplary light sheet used to image a sample with an imaging device (e.g., shown in FIG. 3 or 4) with the VCM off and the VCM on during an experiment. The images show the width of the exemplary light sheet using a scattering phantom with fluorescent nanoparticles. Each of the images, a and b, were taken from the side of the exemplary light sheet using a 1 Ox microscope objective. The top figure, a, shows the effective width of the exemplary light sheet with the VCM off is approximately 250 µm. The bottom figure, b, shows the effective width of the exemplary light sheet is extended to approximately 500 µm when the VCM is on and the lens is moved. The width of the exemplary light sheet is approximately doubled when using the VCM. The arrow in both images, a and b, is pointing at a fluorescent nanoparticle that is not efficiently excited when the VCM is not used but is efficiently excited when the VCM is used.

Figure 6:
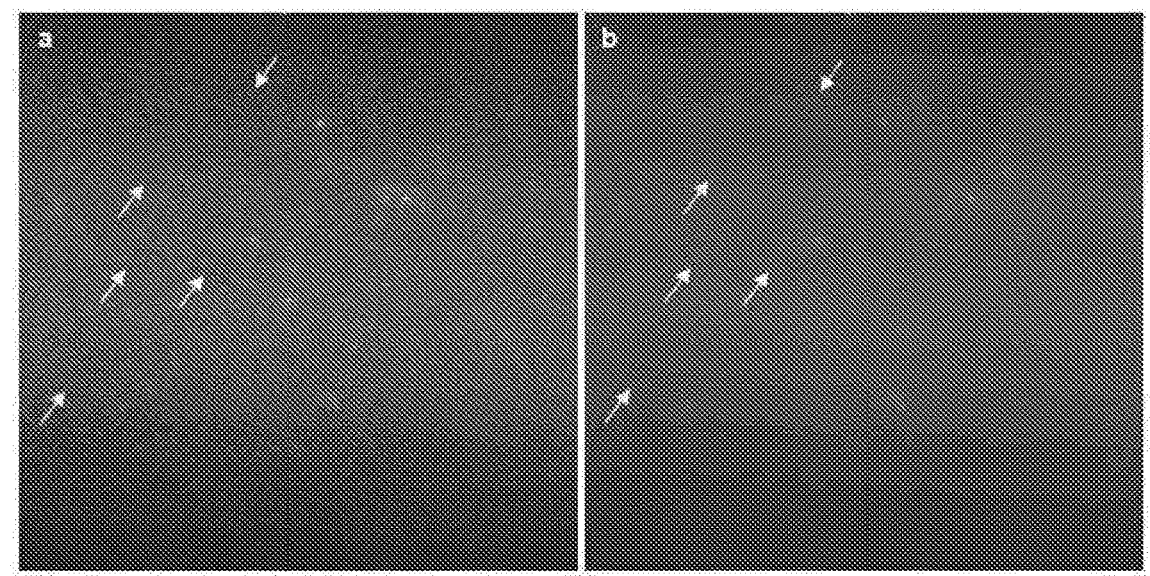
FIG. 6 is a comparison of images of fluorescent nanoparticle phantoms taken with a conventional light-sheet microscope and a light-sheet microscope using the system of FIG. 2.

FIG. 6 shows two images, a and b, of fluorescent nanoparticle phantoms taken from the top of the exemplary light sheet using a 10× microscope objective during an experiment. Image a is an image of the field of view without using the VCM. Image b is an image of the field of view with the VCM in use. The arrows show the beads in image a are not effectively excited without the VCM and the signal from the beads is below the noise floor. In contrast, the arrows show the beads in image b are effectively excited and that the speckle noise caused by the laser light source in this experiment is significantly reduced when using the VCM.

Figure 7:
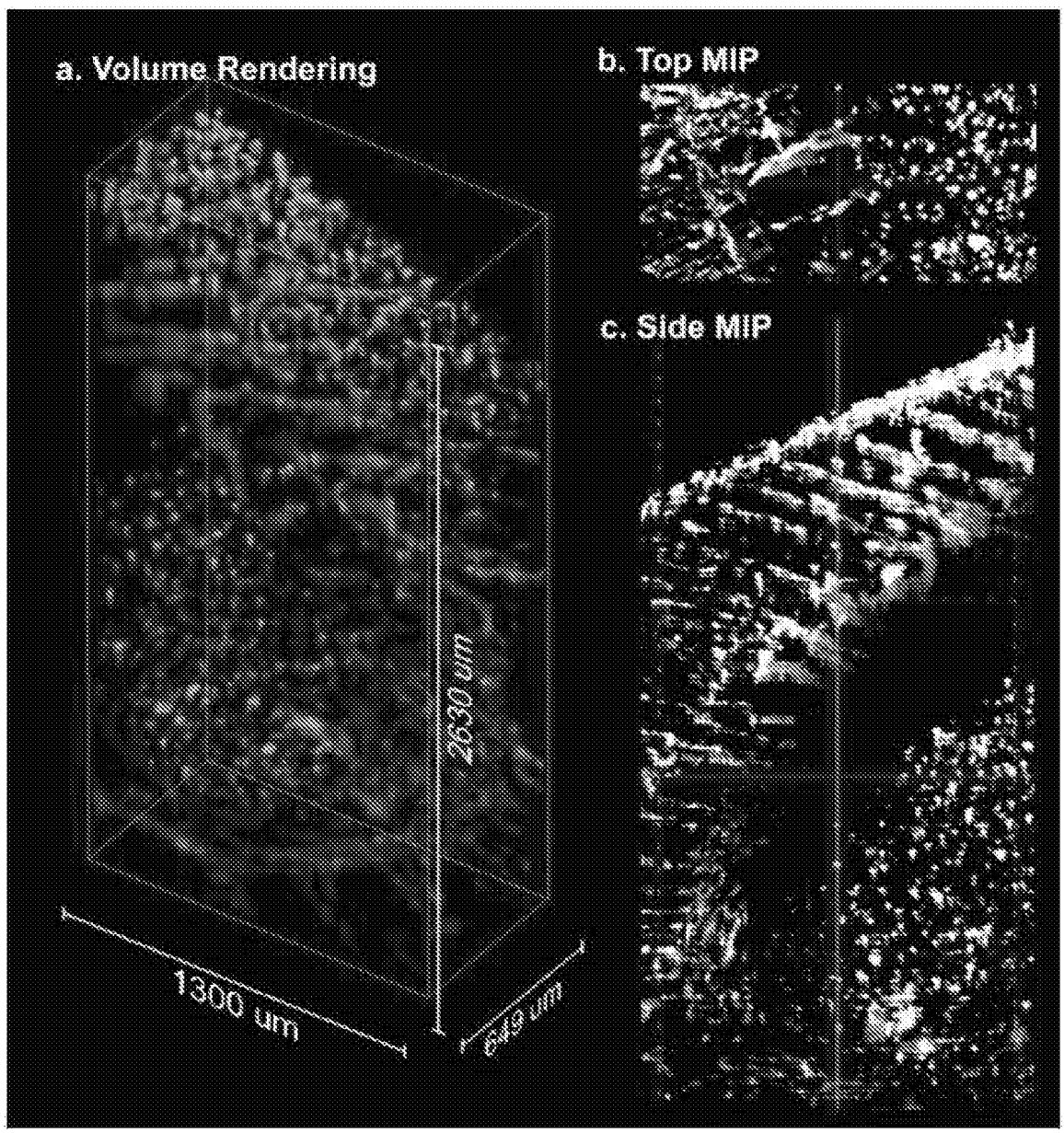
FIG. 7 is three images of actual data acquired from an eYFP quail embryo brain using a light-sheet microscope with the system of FIG. 2.

FIG. 7 shows images of actual data acquired from an eYFP quail embryo brain using an experimental setup such the ones shown in FIGS. 3 and 4. Image a shows a volume rendering of a 2.6 mm section of the eYFP quail embryo brain at the cellular level. Images b and c show the maximum intensity projection of the volume of an approximately 1 mm thick sample of the eYFP quail embryo brain, image b shows a top view and image c shows a side view.

B. Method

Figure 8:
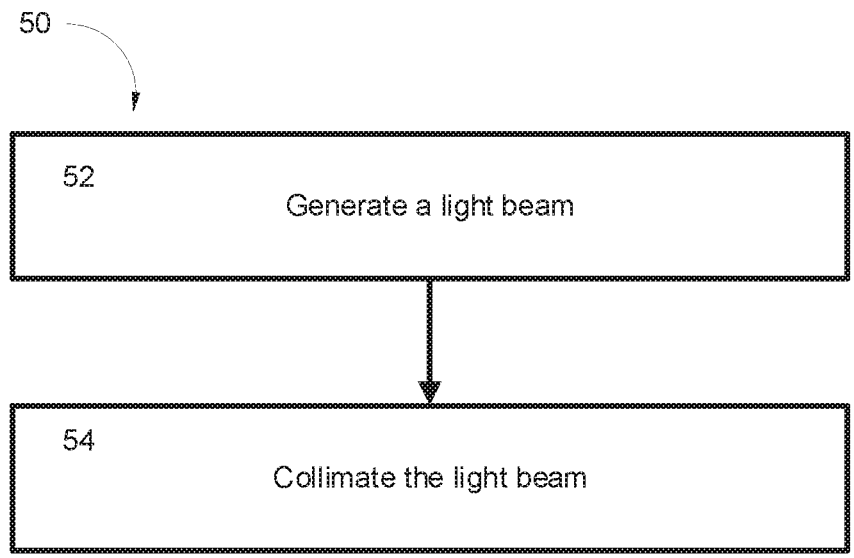
FIGS. 8-10 are process flow diagrams showing example methods for light-sheet microscopy using the system of FIG. 2.
Figure 9:
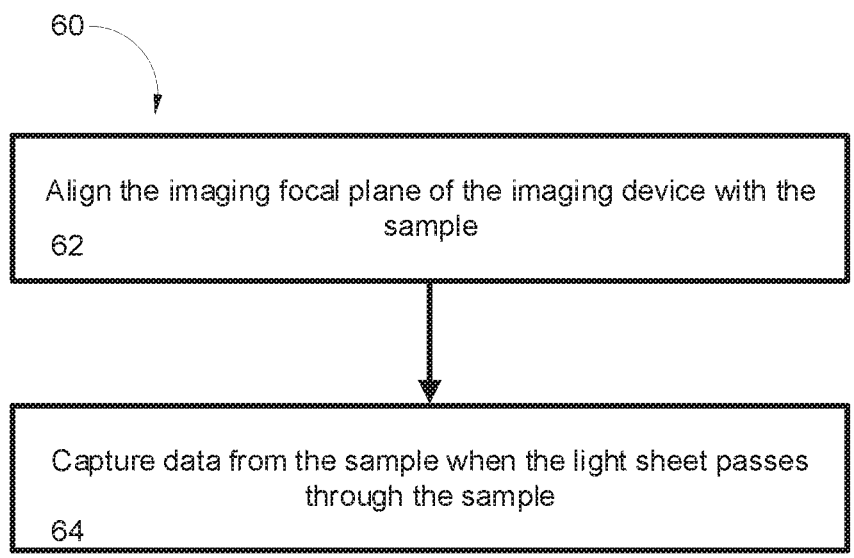
Figure 10:
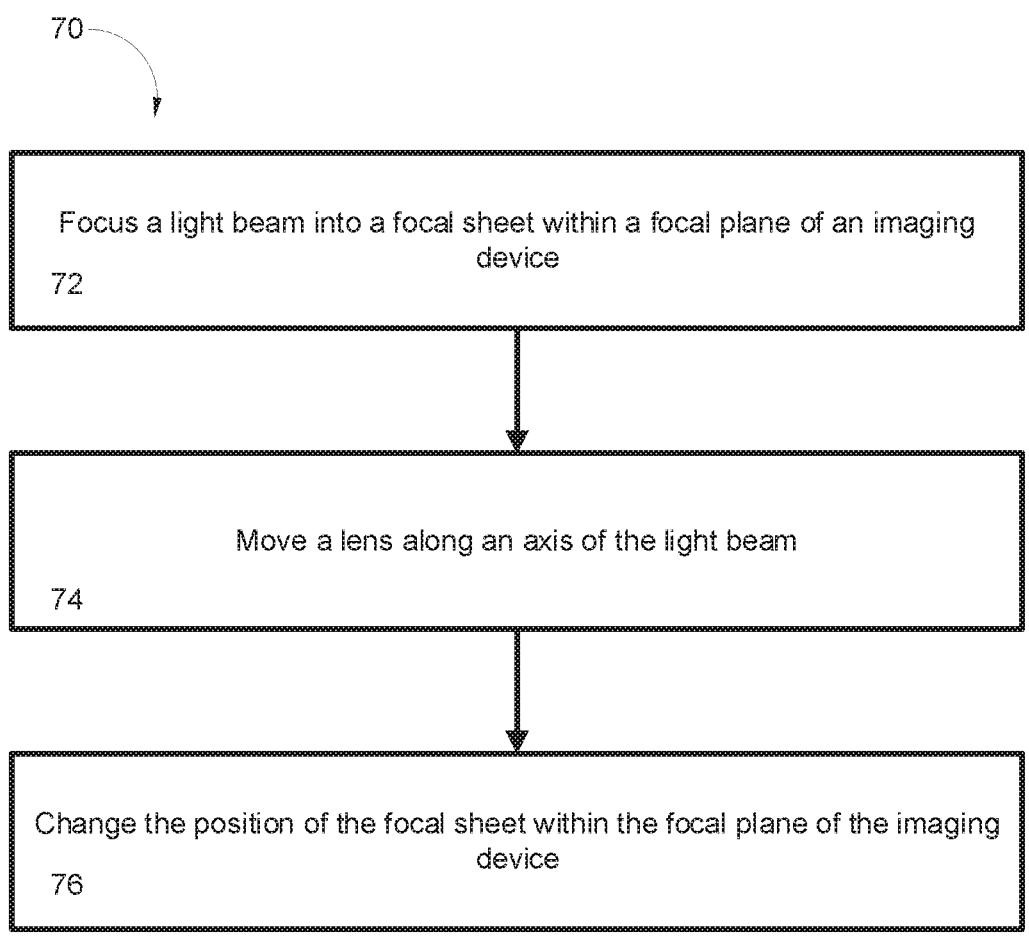

Another aspect of the present disclosure can include methods 50, 60, and 70 as shown in FIGS. 8-10 for facilitating the use of a light-sheet microscope with an improved light focusing system 10. The methods 50 and 60 can be done in conjunction with the method 70 to image a larger field of view than is typically possible with a conventional light-sheet microscope. The methods 50-70 can be performed by the system shown in FIGS. 2, 3 and/or 4.

The methods 50-70 are illustrated as process flow diagrams with flowchart illustrations which can be implemented by one or more components of the light focusing system 10, as shown in FIGS. 2-4. For purposes of simplicity, the methods 50-70 are shown and described as being executed serially; however, it is to be understood and appreciated that the present disclosure is not limited by the illustrated order as some steps could occur in different orders and/or concurrently with other steps shown and described herein. Moreover, not all illustrated aspects may be required to implement the methods 50-70.

Referring now to FIG. 8, illustrated is a method 50 for providing a collimated light beam to the light focusing system 10. At 52, a light beam is generated by a light generation system with a light source that can be a coherent light source (i.e., a laser) or a non-coherent light source (i.e., a light bulb or a candle). The light beam can have a wavelength from 350 nm to 1800 nm. At 53, the light beam is collimated by a collimating optics (lens) contained within the light generation system.

Referring now to FIG. 9, illustrated is a method 60 for capturing image data using a light sheet provided by the light focusing system 10. At 62, the image focal plane of the imaging device is aligned with a sample such that the sample is at least partially within the imaging focal plane and the light sheet is orthogonal/perpendicular to the imaging focal plane when it passes through the sample. At 64, data is captured from the sample when the light sheet passes through the sample in the imaging focal plane. Data can be captured from the sample when the light sheet passes through a portion of the sample in the extended imaging focal plane when the VCM 14 of light focusing system 10 is used to move the lens 12 to a different position. The captured data can be displayed, post-processed, and analyzed with a display connected to a processor and non-transitory memory in wired or wireless connection with the imaging device. The imaging device can be comprised of a compound objective lens oriented such that the focal plane of the compound objective lens is orthogonal to the light sheet, an optical filter, a tube lens, and an image sensor configured to capture data from the sample when the light sheet passes through the sample in the imaging focal plane. The image sensor can be a CCD camera or a CMOS camera. The image sensor can have a rolling shutter or a global shutter. Optionally, the imaging device can be a microscope.

Referring now to FIG. 10, illustrated is method 70 for improved light focusing using a lens attached to a VCM that can be combined with the methods 50 and 60 of FIGS. 8 and 9 to increase the field of view that can be imaged with a light-sheet microscope. At 72, a light beam is focused into a focal sheet within a focal plane of an imaging device. The light beam is provided by a light generation system. The focal sheet is preferably a light sheet that passes perpendicularly through the focal plane of the imaging device. At 74, the lens is moved along an axis of the light beam by a VCM attached to the lens. The VCM can move the lens linearly along the axis of propagation of the light beam. The VCM can move the lens by vibrating at a frequency of approximately 10-100 Hz. The VCM can be manually or automatically controlled by a processer and non-transitory memory in wired or wireless connection with the VCM. The VCM can travel in a range between 100 μm and 7 mm. At 76, the position of the focal sheet, which is a light sheet, changes within the focal plane of the imaging device creating an extended imaging focal region. The change in position of the light sheet is proportional to the change in position of the lens moved by the VCM. The extended imaging focal region can then be used in the method 60 to image a greater field of view of a sample positioned within the focal plane of the imaging device.

Using a light focusing system 10 with lens attached to a VCM to extend the imaging focal region of an imaging device is a cost effective and simple solution for imaging larger sample with light-sheet microscopy. The VCM attached to a lens is a low-cost alternative to current system which use expensive linear actuators or piezo scanners to move the sample or the imaging device.

IV. Improving the Light Generation System 20: Multimode Laser Light Source

Conventional light-sheet microscopes generally use expensive single mode lasers as their light source because single mode lasers usually have a good beam quality and enable diffraction limited Gaussian focusing. However, single mode lasers are often quite expensive and require sophisticated instrumentation to operate successfully. Additionally, because the spot size of single mode lasers is usually circular, complex cylindrical relays are often required to increase the ellipticity of the light beam in order to create a desired width of the light sheet. Moreover, it is difficult to produce a uniform intensity profile due to the nature of Gaussian focusing because the center of the light beam of a single mode laser is always brighter than the edge of the light beam, which often limits the use of optical power and requires extra post processing to correct.

Figure 11:
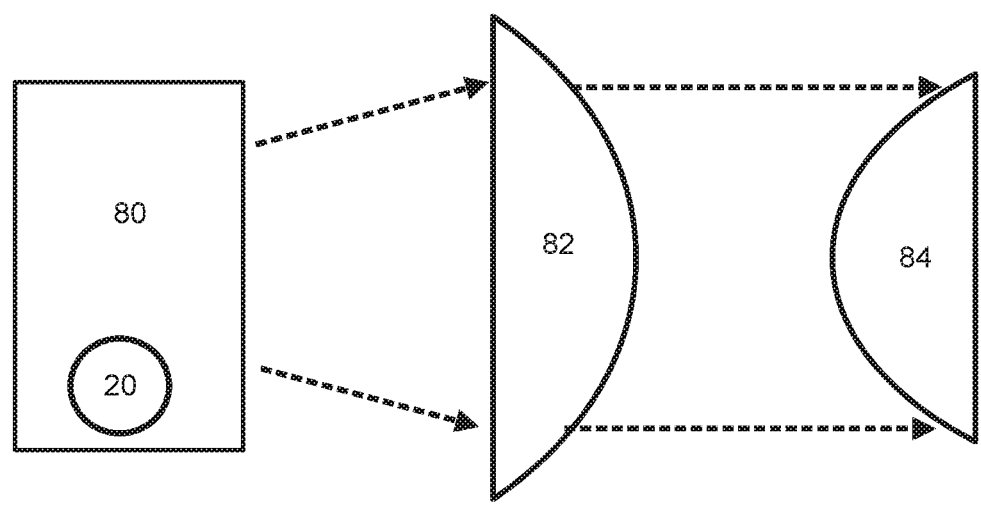
FIG. 11 is a diagram of an improved light generation system for light-sheet microscopy.

Another aspect of the present disclosure can include an improvement to a light generation system 20 using one or more multimode laser light sources (e.g., multimode laser diodes), as shown as element 80 in FIG. 11. The one or more multimode laser light sources of the system 20 can reduce the cost and improve the performance of light-sheet microscopes, as well as reduce the size of the illumination setup compared to conventional light-sheet microscopy designs. Although multimode laser light sources (e.g., multimode laser diodes) are well-known for their poor beam quality, majorly due to the high ellipticity of the beam and the presence of the higher order Hermite-Gaussian transverse modes (often seen as a major disadvantage), but for light-sheet microscopy, these purported disadvantages can be very advantageous.

A. System

Shown in FIG. 11 is a system for light sheet microscopy including a light generation system 20 (improved by multimode laser source 80) with a collimating lens 82 (or other collimation device) and a focusing lens 84 (also referred to as a "lens"). The light generation system 20 can produces a light beam profile with a uniform intensity, thereby removing limits on optical power use and the need for extra post-processing of light-sheet microscopy images.

As an example, the multimode laser source 80 can include one or more multimode laser diodes (accordingly, the multimode laser source 80 may be referred to as multimode laser diode 80, which may include one or more laser diodes). While multimode laser diodes are well-known for the poor beam quality, majorly due to the high ellipticity of the beam and the presence of the higher order Hermite-Gaussian transverse modes, the asserted poor beam quality is actually quite advantageous in light-sheet microscopy. As ellipticity is a potential need for some light sheet microscopy designs, such ellipticity can be readily produced from the output of a typical multimode laser diode using a simple collimating lens. Beam divergence of a typical multimode laser diode often different by 3-4 times in perpendicular and parallel direction respect to the emitting layer, which is ideal for some light sheet microscope designs. Although multimode laser diodes have more than one transverse mode in the direction parallel to the emitting layer, only one mode exist in the direction perpendicular to the emitting layer, which is a disadvantage of many laser applications due to disabling diffractive limited focusing, but for light sheet microscopy, which only require good focusing in one direction, this is advantageous because overlapping of the higher order mode lobes can produce a wider and flatter profile near the center of the beam compared to a single mode Gaussian beam (another desired property for light-sheet microscopy). Additionally, multimode laser diodes are much cheaper and more powerful than single mode laser diodes (both strong benefits for light-sheet microscopy applications).

The multimode laser diode 80 can be configured to output a light beam with a high order Hermite-Gaussian mode. A Hermite polynomial of a Gaussian function of a beam profile of the light beam has an index equal to zero in one dimension and greater than zero in another dimension. The multimode laser diode 80 can have an emission wavelength range from 350 nm to 1800 nm. The collimating lens 82 can be configured and positioned to collimate the light beam. Examples of the collimating lens 82 can include a single aspherical lens, a spherical achromatic doublet, a compound lens. Or the like. The lens 84 can be configured to focus the collimated light beam into a focal sheet (or light sheet) that passes through a sample within an imaging focal plane of an imaging device (e.g., any device with an image sensor like a microscope). The lens 84 can be a single element lens or a compound lens that is cylindrical or acylindrical. It should be noted that the lens 84 can be mounted on a fixed optical mount, a traditional motor, a voice coil motor, or the like.

As shown in FIG. 11, the multimode laser diode 80, the collimating lens 82, and the lens 84 can be positioned such that the optical axis of at least two of the multimode laser diode 80, the collimating lens 82, and the lens 84 are configured to align. In some instances, the optical axes of all three components may be configured to align. The surface of the lens 94 can be parallel to an emitting layer of the multimode laser diode 84.

Figure 12:
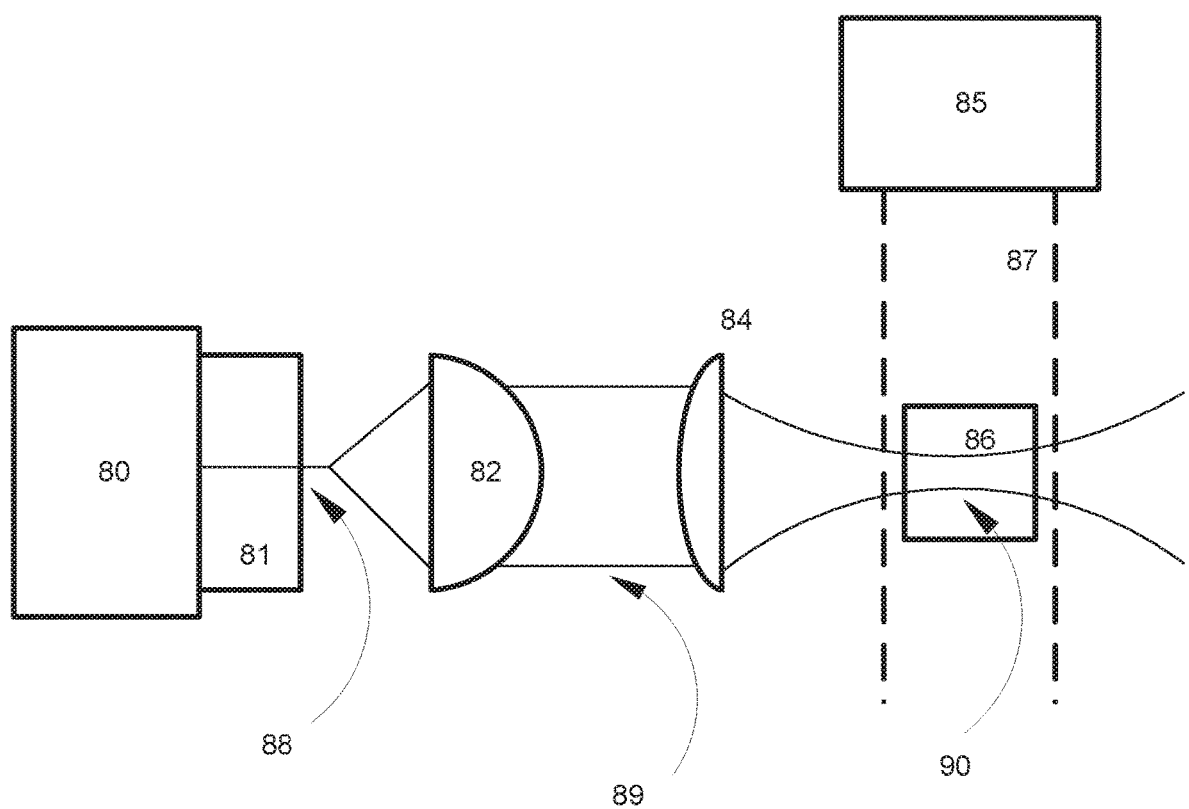
FIG. 12 is a detailed diagram showing the system of FIG. 11 used for light-sheet microscopy.

Shown in FIG. 12 is a detailed example of the light generation system 20 configured with other components to perform light-sheet microscopy. Using the multimode laser diode 80, a light-sheet illumination setup suitable for microscopy applications can be generated with two additional optical elements (the multimode laser diode 80 and the emitting layer 81), which drastically reduce the size of the illumination setup compared to conventional light-sheet microscope designs.

The multimode laser diode 80 has an emission wavelength range from 350 nm to 1800 nm and can be configured with an emitting layer 81. The emitting layer 81 emits the light beam 88 from the multimode laser diode 80. The collimating lens 82 collimates the light beam 88 and the lens 84 focuses the collimated light beam 89 into a focal sheet 90 (or light sheet). The collimating lens 82 can be a single aspherical lens, a spherical achromatic doublet, or a compound lens. The surface of the lens 84 can be parallel to an emitting layer 81 of the multimode laser diode 80. The lens 84 can be either a cylindrical lens or an acylindrical lens. The lens 84 can also be either a single element lens or a compound lens. Additionally, the lens 84 can be mounted on a fixed optical mount or on a VCM. An imaging device 85 provides an imaging focal plane 87 and captures data when the focal sheet 90 passes through a sample 86 in the imaging focal plane 87.

The imaging device 85 can be oriented so that the imaging focal plane 87 and the focal sheet 90 are perpendicular or orthogonal to each other. The imaging device 85 can be a previously constructed microscope or the imaging device 85 can comprise a compound objective lens, an optical filter, a tube lens, and an image sensor. The compound objective lens can be oriented such that the focal plane of the compound objective lens is orthogonal to the light sheet. The image sensor can be configured to capture the data when the focal sheet 90 passes through the sample 86 in the imaging focal plane 87. The image sensor can be a CCD camera, a CMOS camera, or the like, and the image sensor can optionally have a rolling shutter (or other type of shutter). The data captured by the imaging device 85 can be displayed, post processed, and analyzed on a display (not shown) with a processor and non-transitory memory in wired or wireless connection with the imaging device 85 using imaging software (such as ImageJ).

Optionally, if the lens 84 is attached to a VCM (not shown) to form the light focusing system 10, then the VCM can linearly move the lens 84 to create an extended image focal plane (not shown). Combining the light generation system 20 and the light focusing system 10 allows imaging of a sample requiring a larger field of view with greater optical power and less post processing.

Figure 13:
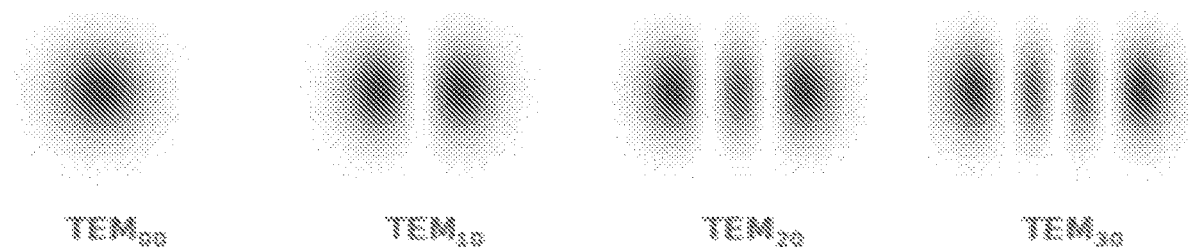
FIG. 13 is an image showing example of single and higher order Hermite-Gaussian modes.

FIG. 13 shows examples of a single order ($TEM_{00}$) and higher order ($TEM_{11}$, $TEM_{20}$, and $TEM_{30}$) Hermite-Gaussian transverse modes generated by a laser diode. TEM stands for transverse electro magnetic. The higher order Hermite-Gaussian modes have multiple mode lobes. Hermite-Gaussian modes can refer to propagation modes or resonator modes which are described with Hermite-Gaussian functions. Modes are self-consistent electric field distributions in free space or transparent mediums. A Gaussian beam, such as the light beam provided by the multimode laser diode 80 of FIGS. 11 and 12, expands or contracts during propagation but is self-consistent in the sense that the amplitude profile is only scaled in the transverse dimension. The Hermite-Gaussian mode electric field distributions are essentially given by the product of a Gaussian function and a Hermite polynomial, apart from the phase term:

$$E_{nm}(x, y, z) = E_0 \frac{w_0}{w(z)} \cdot H_n\left(\sqrt{2}\frac{x}{w(z)}\right) \exp\left(-\frac{x^2}{w(z)^2}\right) \cdot H_m\left(\sqrt{2}\frac{y}{w(z)}\right)$$

$$\exp\left(-\frac{y^2}{w(z)^2}\right) \cdot \exp\left(-i\left[kz - (1 + n + m)\arctan\frac{z}{z_R} + \frac{k(x^2 + y^2)}{2R(z)}\right]\right)$$

where $H_n(x)$ is the Hermite polynomial with the non-negative integer index n. The indices n and m determine the shape of the profile in the x and y direction, respectively. The quantities w and R evolve in the z direction.

The multimode laser diode 80, shown in FIGS. 11 and 12 is configured to output a light beam with a high order Hermite-Gaussian mode. The Gaussian beam output by the multimode laser diode 80 is a beam of monochromatic electromagnetic radiation whose amplitude envelope in the transverse plane is given by a Gaussian function, which implies a Gaussian beam intensity profile. A Hermite polynomial of a Gaussian function of the beam profile of the light beam has an index equal to zero in one dimension and greater than zero in another dimension.

The beam profile of a Gaussian light beam with a high order Hermite-Gaussian mode is advantageous for light-sheet microscopy. The beam divergence of a typical multi-mode laser diode can often differ by 3 to 4 times in the perpendicular or parallel directions with respect to the emitting layer, which is ideal for designing a light-sheet microscope. The multimode laser diode 80, shown in FIGS. 11 and 12, contains more than one transverse mode in the direction parallel to the emitting layer and only one transverse mode in the direction perpendicular to the emitting layer, this is exemplified by the higher order Hermite-Gaussian modes in FIG. 13. Multiple transverse modes in one direction and only one transverse mode in another are advantageous for light-sheet microscopy because good focusing is only required in one direction. Additionally, the overlapping of higher order mode lobes can produce a wider and flatter beam profile near the center of the light beam compared to a single mode laser diode (with a single mode Gaussian light beam). A multimode laser diode is also significantly cheaper and more powerful than a single mode laser diode. Because the beam profile of the light beam output from the multimode laser diode is so advantageous for light-sheet microscopy the light generation system 20 specifically does not include a slit to clean up the beam profile. Previous systems that comprised a multimode laser diode for light-sheet microscopy have all used a slit to clean up the beam profile, thereby removing the advantages harnessed by this aspect of the present disclosure.

Figure 14:
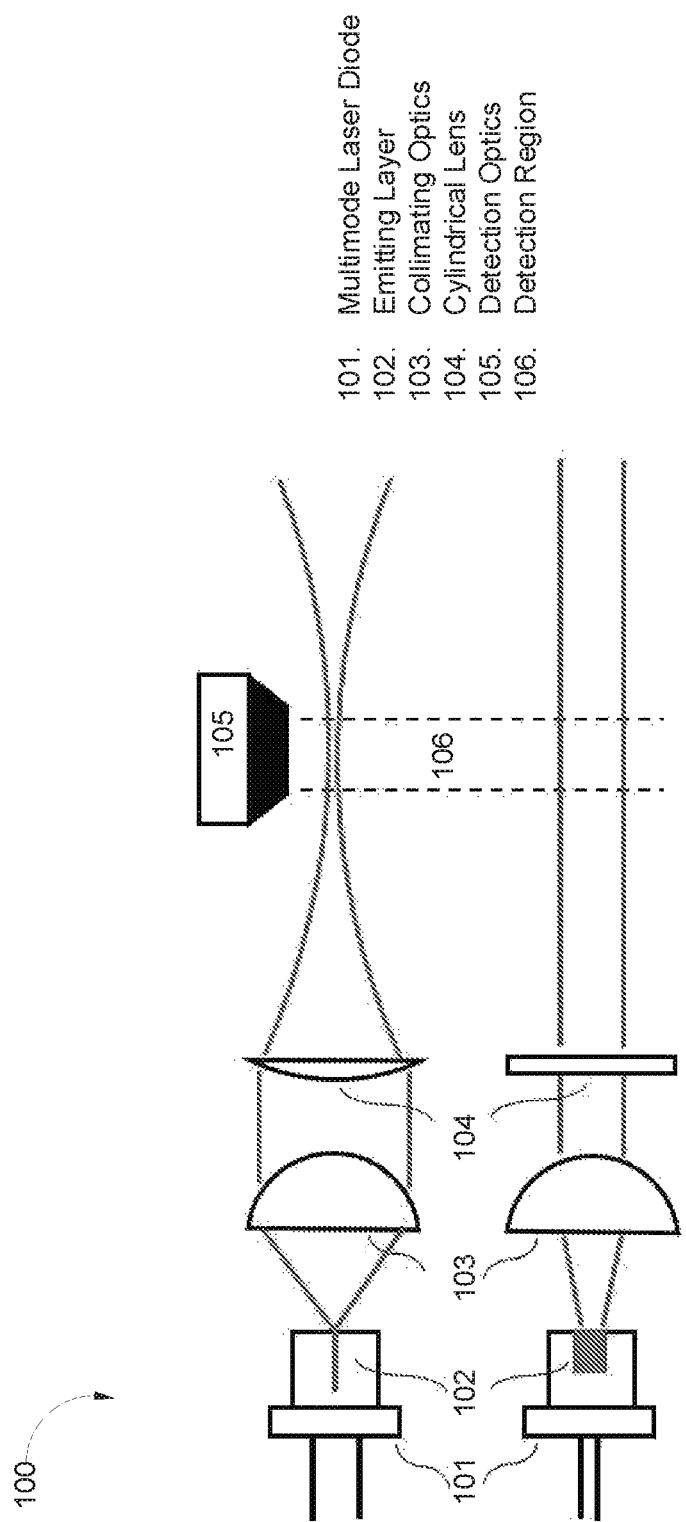
FIG. 14 is a diagram showing an experimental setup using the system of FIG. 11.

Now referring to FIG. 14, a side view (top) and a top view (bottom) of an experimental setup 100 using the light generation system 20 for light-sheet microscopy is shown. The experimental set up 100 includes a multimode laser diode 101 with an emitting layer 102 which provides a light beam. A collimating optics (lens) 103 collimates the light beam and the cylindrical lens 104 focuses the collimated light beam into focal sheet. A detection optics 105 provides a detection region 106 which is perpendicularly intersected by the focal sheet. A sample (not shown) can be positioned within the detection region 106 and the detection optics can capture date from the sample when the focal sheet passes through the sample. The captured data can be transformed into a 2D or 3D image for further analysis. The side view (top) shows the narrow beam in one dimension and the top view (bottom) shows the wide beam in another dimension.

Figure 15:
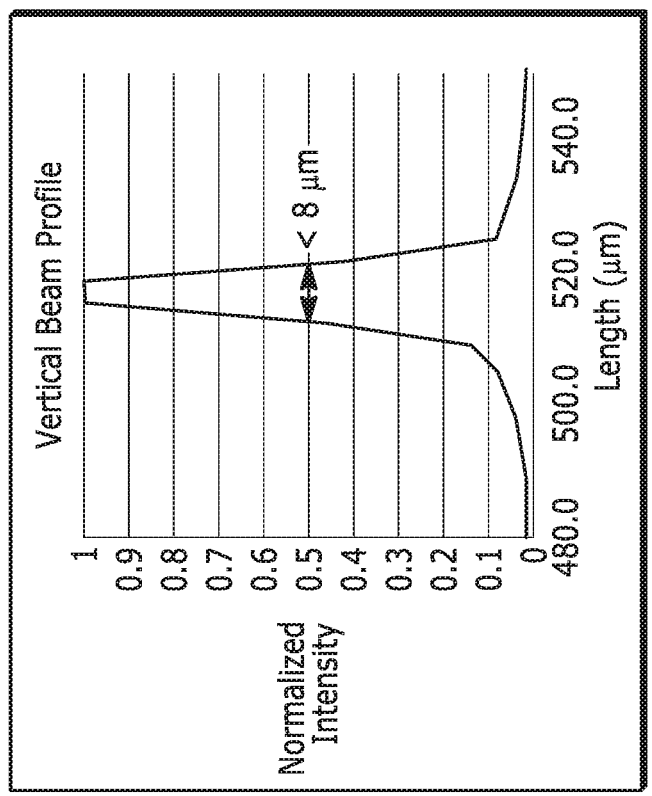
FIG. 15 includes plots of horizontal and vertical beam profiles.
Figure 15:
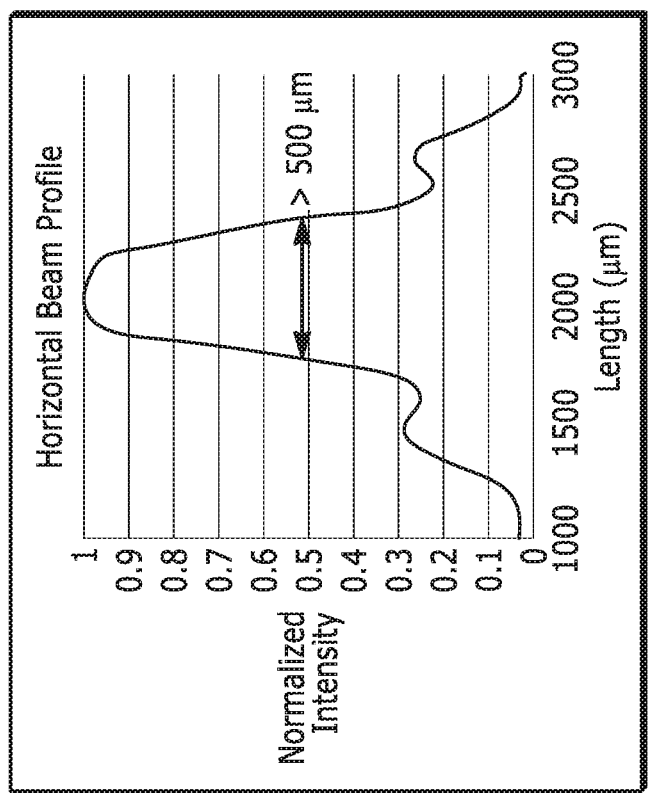

FIG. 15 shows beam profile measurements taken with a beam profiler at the focus of the experimental setup 100 of FIG. 14. The horizontal beam profile (the other direction of the bottom of FIG. 14) shows the field of view at the focus is greater than 500 μm and the vertical beam profile (the direction of the top of FIG. 14) shows that the optical sectioning at the focus is less than 8 μm. The focal sheet generated by the experimental setup 100 is therefore wide and flat, which is optimal for light-sheet microscopy.

Figure 16:
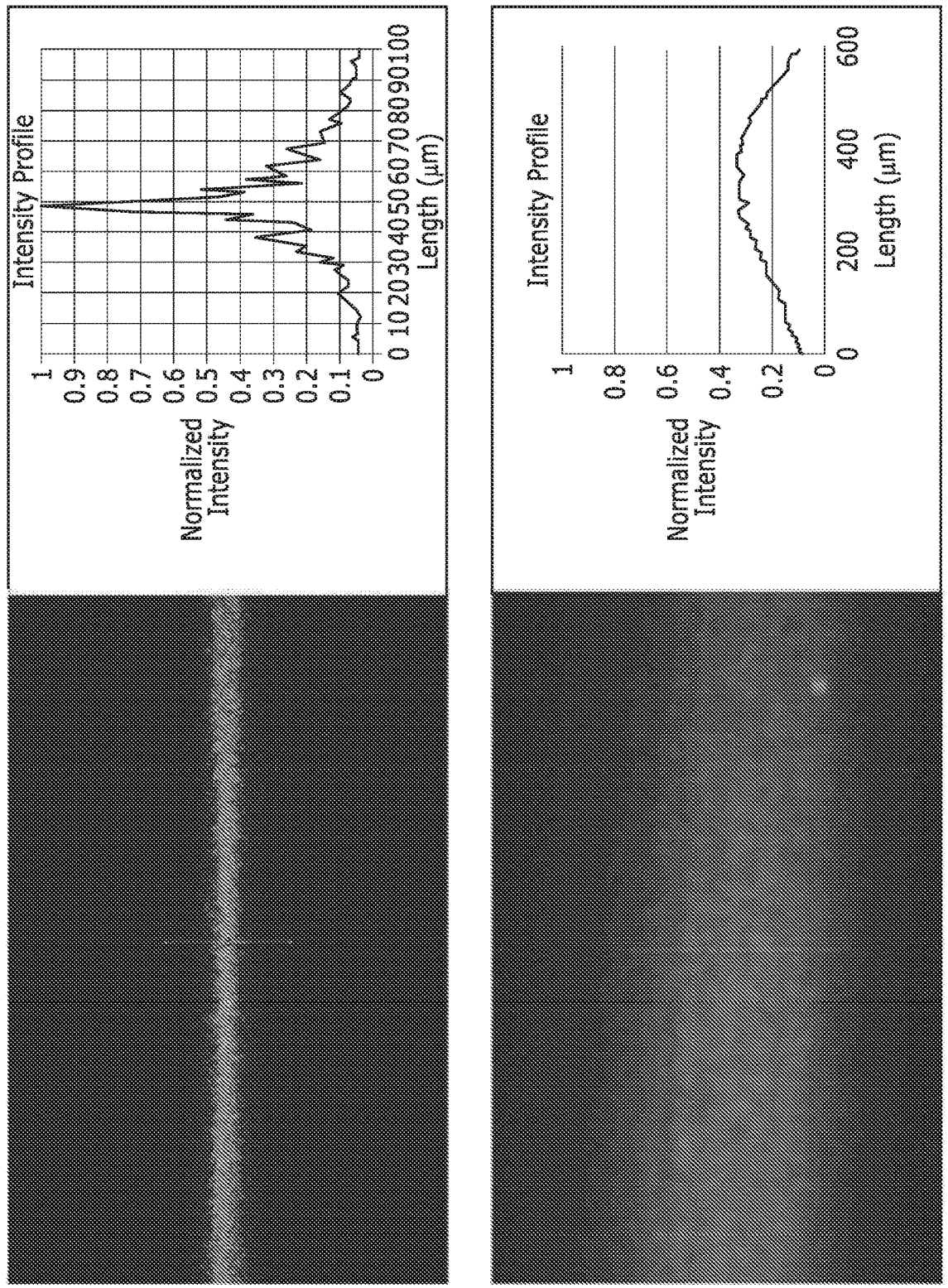
FIG. 16 includes top and side view images of a light sheet and corresponding intensity profiles.

FIG. 16 shows images of beam profiles of the focal sheet generated by the experimental setup 100 with accompanying intensity profiles. The focal sheets were imaged near the focus of the experimental setup 100 in a slightly scattering medium using a microscope. The top image shows the side view of the focal sheet and the bottom image shows the top view of the focal sheet. The bottom image was normalized based on min-max pixel intensity and then Gaussian filtered to reduce laser speckle noise. To the right of the top image is a normalized intensity profile plot taken along the line shown in the image on the top left. The normalized intensity profile plot shows the full width at half maximum of the light sheet at that line is approximately 6 μm. To the right of the bottom images is a normalized intensity profile plot taken along the line shown in the image on the bottom left. The normalized intensity profile plot shows a relatively uniform intensity profile through the entire field of view. A relatively uniform intensity profile through the entire field of view (but in only one dimension) is beneficial for light-sheet microscopy.

B. Method

Figure 17:
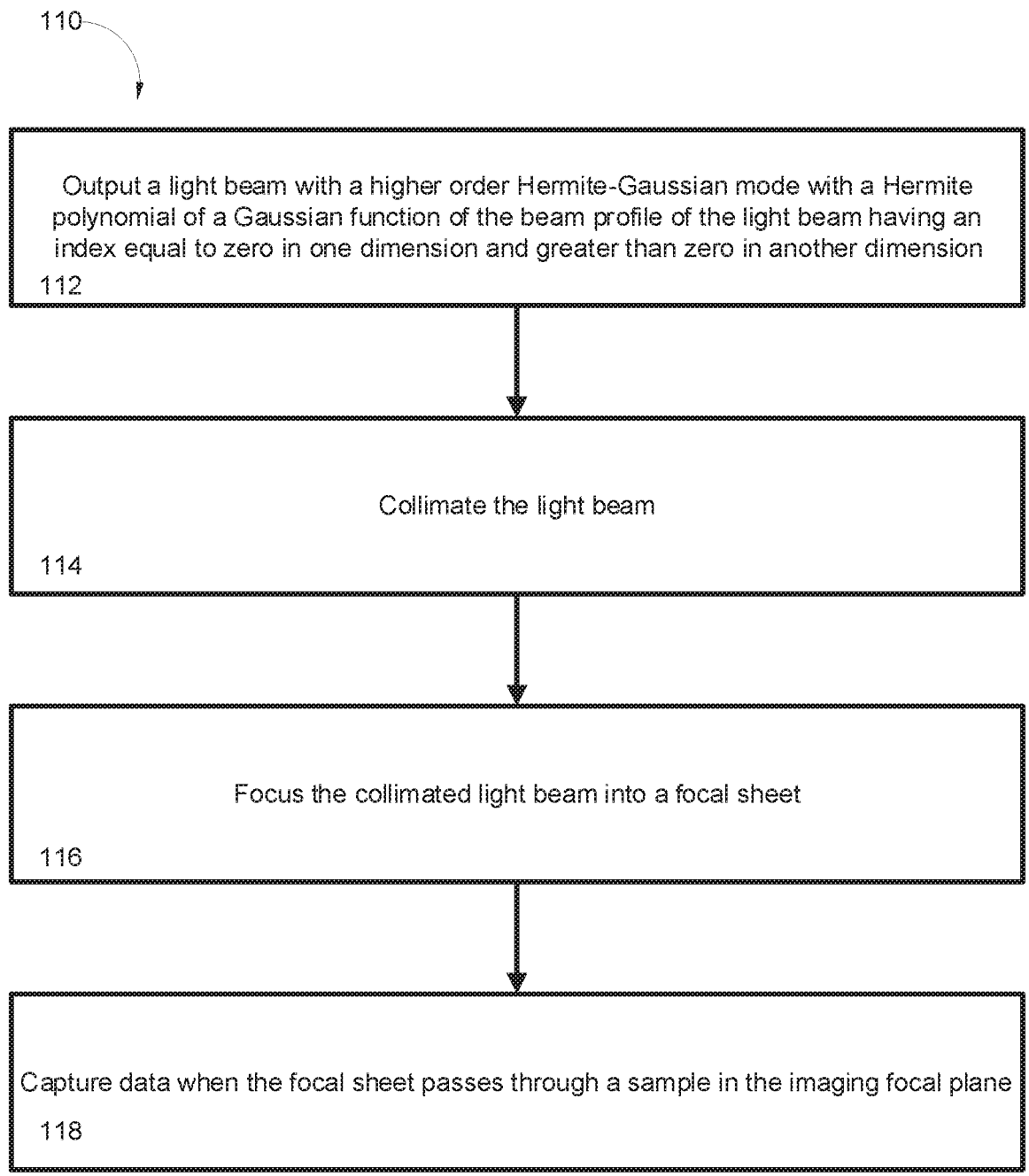
FIG. 17 is a process flow diagram showing an example method of using the system of FIG. 11.

Another aspect of the present disclosure can include a method 110 as shown in FIG. 17 for facilitating the use of a light microscope with an improved light generation system 20. The method 110 can be used to improve the images take with light-sheet microscopy by improving the uniform intensity of a beam profile and allowing higher optical powers to be used. The method 110 can be performed by the system of FIG. 11 and FIG. 12, for example.

The method 110 is illustrated as a process flow diagram with flowchart illustrations. For purposes of simplicity, the method 110 is shown and described as being executed serially; however, it is to be understood and appreciated that the present disclosure is not limited by the illustrated order as some steps could occur in different orders and/or concurrently with other steps shown and described herein. Moreover, not all illustrated aspects may be required to implement the method 110.

Referring now to FIG. 17, illustrated is a method 110 for using the light generation system 20 to improve light-sheet microscopy. At, 112 a multimode laser diode outputs a light beam with a higher order Hermite-Gaussian mode, where a Hermite polynomial of a Gaussian function of the beam profile of the light beam has an index equal to zero in one dimension and greater than zero in another dimension. The multimode laser diode can have an emission wavelength range from 350 nm to 1800 nm. At 114, the light beam is collimated by a collimating lens. The collimating lens can be a single aspherical lens, a spherical achromatic doublet, or a compound lens. At 116, the collimated light beam is focused into a focal sheet by a lens. The lens may be cylindrical or acylindrical, and the lens can be a single element lens or a compound lens. The lens can be mounted on a fixed optical mount or on a VCM. The optical axis of at least two of: the multimode laser diode, the collimating lens, and the lens can be configured to align. The optical axes of all three components can be configured to align. Additionally, the surface of the lens can be parallel to an emitting layer of the multimode laser diode. At, 118, data is captured, by an imaging device, from a sample when the focal sheet passes through the sample in the imaging focal plane of the imaging device.

The imaging device can be oriented so that the imaging focal plane and the focal sheet are perpendicular, or orthogonal, to each other. The imaging device can be a previously constructed microscope, or the imaging device can comprise a compound objective lens, an optical filter, a tube lens, and an image sensor. The compound objective lens can be oriented such that the focal plane of the compound objective lens is orthogonal to the light sheet. The image sensor can be configured to capture the data when the focal sheet passes through the sample in the imaging focal plane. The image sensor can be a CCD camera or a CMOS camera, and the image sensor can optionally have a rolling shutter. The data captured by the imaging device 85 can be displayed, post processed, and analyzed on a display (not shown) with a processor and non-transitory memory in wired or wireless connection with the imaging device 85 using imaging software (such as ImageJ).

Optionally, the if the lens is mounted on the VCM to form the light focusing system 10, then the VCM can linearly move the lens to create an extended imaging focal plane. Moving the lens allows a sample requiring a larger field of view to be imaged with greater optical power and less post processing.

Using the light generation system 20 where the multimode laser diode emits a light beam unconstrained by a slit improves the uniformity of the light beam profile intensity and allows imaging with higher optical power without the need for extra and/or expensive components.

V. Improving the Imaging System 30: Cylindrical Solid Immersion

With light-sheet microscopy, it is difficult to increase optical resolution while minimizing optical aberrations. Conventional light-sheet microscopes often use a single cylindrical lens with a low numerical aperture to focus a collimated light beam into a light sheet. However, with a single cylindrical lens, optical aberrations are significant if any lens other than a low numerical aperture lens is used, and a low numerical aperture lens often results in poor resolution. To remedy this problem conventional light-sheet microscopes sometimes use a compound cylindrical lens with multiple optical elements. However, compound cylindrical lenses are not commercially available due to limited demand and custom ordered lenses are expensive. Another way to remedy optical aberrations is to use a high numerical aperture immersion microscope objective during light sheet generation. In this case a light sheet is traditionally achieved by scanning a point, utilizing a Bessel beam, or using a 4f optical system to relay the focus of a cylindrical lens. Each of these methods require expensive and sophisticated optical and optoelectrical components with complicated alignments.

Figure 19:
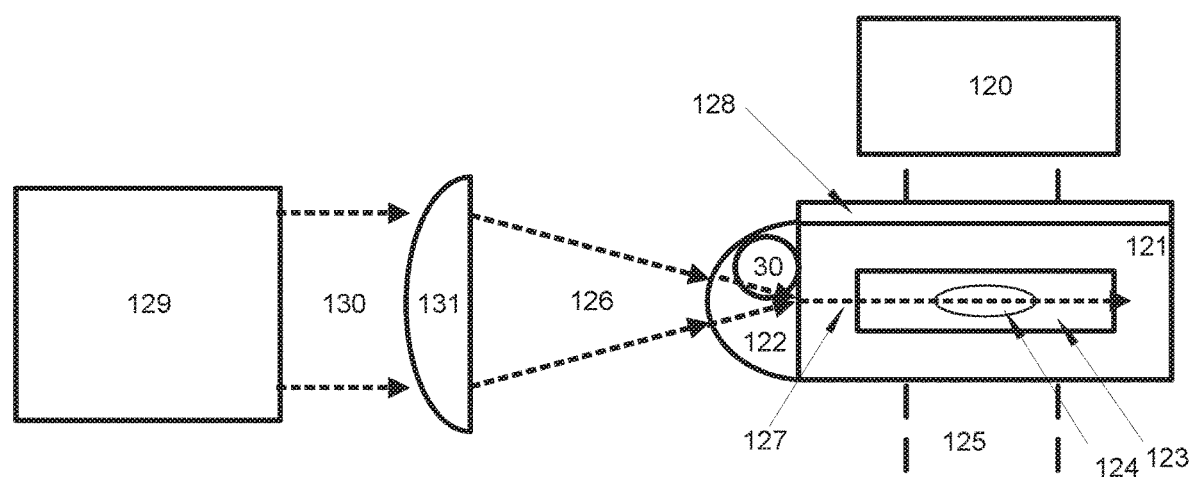
FIG. 19 is a detailed diagram incorporating the system of FIG. 18 for light sheet microscopy.

Another aspect of the present disclosure can include an improvement to an imaging system 30 that can increase the resolution of light-sheet microscopy. The resolution can be increased by minimizing optical aberrations with the imaging system 30 using the cylindrical solid immersion, as shown in FIG. 19. Additionally, better optical sectioning can be achieved using an optical window with a cylindrical surface that reduces the optical aberration and improves the light sheet beam width.

A. System

Solid immersion lenses are an imaging technique to boost optical resolution by a factor of the refractive index of the material. One of the traditional solid immersion configurations is to place a spherical half ball lens between the sample and an air objective lens. The sample is in contact with the half ball lens and positioned in a way that is both at the designed focus of the air objective lens and the center of curvature of the half ball lens (geometrical center of the flat plane). In ideal conditions, implementation of a solid immersion lens can improve resolution of the imaging system by a factor equal to the refractive index of the half ball lens, and will introduce minimal optical aberrations in imaging because the solid immersion lens introduces significant distortion at larger field angles. However, this design using the solid immersion lens has limited applications in imaging because the solid immersion lens introduces significant distortion at larger field angles and is only suitable for focusing light to a single point in most applications. Accordingly, the traditional solid immersion configurations would not be applicable in light-sheet microscopy.

With light-sheet microscopy, the simplest way to generate a light-sheet is to focus a collimated beam using a lens (e.g., a cylindrical lens or an acylindrical lens), but optical aberrations are significant. Only lenses with low numerical aperture (NA) can be used, so it is difficult to generate a thin light sheet with this configuration. This problem could be solved by using a compound cylindrical lens with multiple optical elements, but such compound cylindrical lenses are not commercially available due to limited demand, and these lenses are unlikely to be available at low cost in the near future.

To address this problem, conventional high resolution light-sheet microscopes often use high NA immersion microscope objectives to reduce optical aberrations during light-sheet generation. In this case, light-sheet generation is achieved by scanning a point, Bessel beam, or using a 4f optical system to relay the focus of a cylindrical lens. In all situations, expensive optical and optoelectrical components are required. Alignment of such a system is also more complicated compared to direct cylindrical lens focusing. Because light sheet focusing is indeed single point focusing in one dimension and collimation in the other dimension, many optical aberrations can be ignored in the optical design of light sheet formation (e.g., coma, field curvature, etc.). Off-the-shelf single element acylinder lenses are capable of focusing to a very tight spot in air, but they cannot be implemented to high resolution light-sheet focusing directly because there is often a flat optical window in conventional light-sheet chambers between the air and liquid interface. This optical window will introduce distortions, primarily spherical aberration, to the system, which impairs the quality of the focused sheet.

By introducing the solid immersion concept into light sheet microscopy illumination design, high NA light sheet focusing can be achieved with a simple optical configuration. Instead of using an expensive high NA immersion microscope objective, a much cheaper high NA cylindrical lens pair/acylinder lens is used for focusing. This is similar to the less expensive but looser focusing simple light-sheet design. To reduce spherical aberration and increase focal power, a plano-convex cylindrical lens is used to replace the common flat optical window of a conventional light sheet microscope sample chamber. The refractive index (RI) of the cylindrical lens should be similar to the RI of the immersion medium (e.g., Silica for glycerol immersion, BK-7 for oil immersion, etc.), and the sample is placed at the center of curvature of the cylindrical lens. This will create a solid immersion effect in the dimension of focusing, while leave the beam collimated in the other dimension. The overall effect is a tighter focused light sheet, providing thinner light sheets and higher axial resolution for the system. Indeed, a cylindrical solid immersion window provides sharper focusing and superior spherical aberration correction compared to a flat optical window and reduce the size of the optical system.

With cylindrical solid immersion, light sheet thickness can be reduced by a number similar to the RI of the immersion medium. Spherical aberration that limits the sheet thickness is also eliminated. Because light-sheet microscopy illumination only requires beam focusing at the center of the optical axis within a small area, all major limitations of solid immersion (e.g., field curvature, coma) are not affected in this design. By moving the location of the focusing element (e.g., an acylinder lens) along the optical axis by a small amount (~1 mm), the location of the light sheet can be moved by the same amount, providing additional alignment flexibility, and the ability to scan a narrow light sheet to form a broader light sheet to cover the entire field of view of a microscope objective (20× to 50×). Such scanning movement can be facilitated using a high speed linear motion device such as a piezo motor or a voice coil motor. Cylindrical solid immersion can significantly reduce the cost and design complexity of a high resolution light-sheet microscope (by more than 10-100 times), which is essential to low-cost light-sheet microscopy systems. This simple design can also be easily implemented into some existing light-sheet microscope designs without significant modification. As a side advantage, cylindrical solid immersion reduces the distance between the focusing element and the sample (by a factor around 1.25). This is helpful for designs that are compact and space limited.

Figure 18:
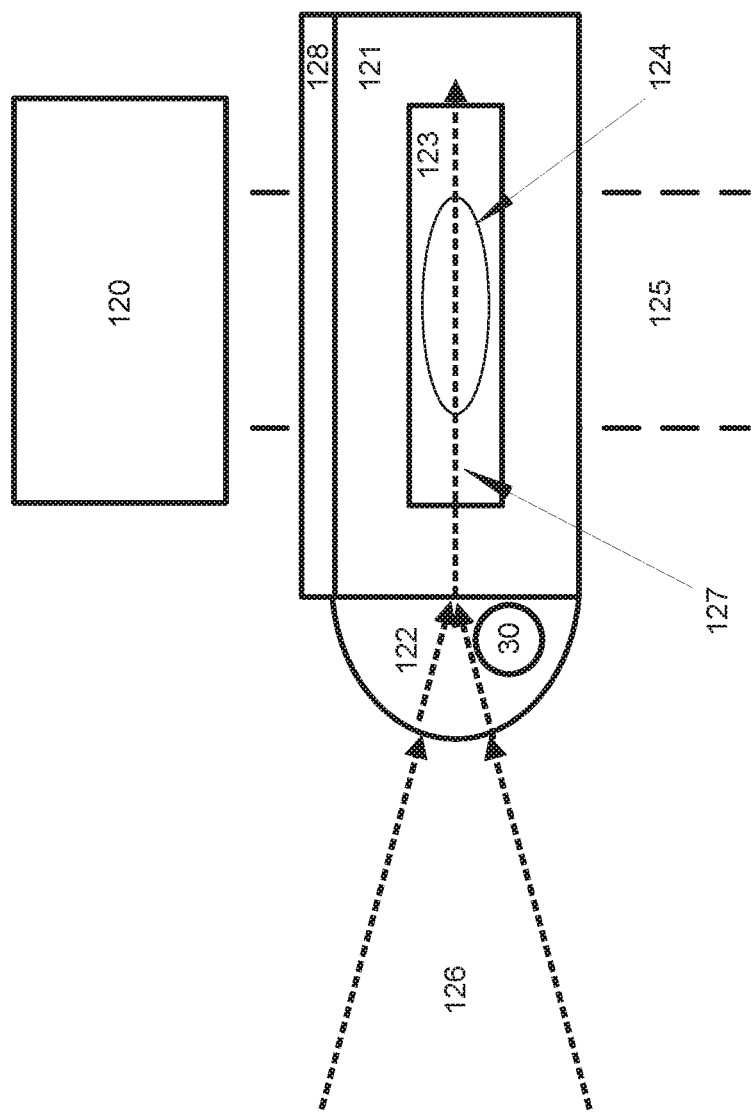
FIG. 18 is a diagram of an improved imaging system for light-sheet microscopy with an improved sample holder.

Accordingly, another aspect of the present disclosure can include a system for increasing optical resolution while minimizing optical aberrations when imaging a sample with light-sheet microscopy. As shown in FIG. 18, the imaging system 30 comprises an imaging device 120 and a fluid chamber 121 having a positive cylindrical optical window 122 and a sample holder 123. The positive cylindrical optical window 122 has a planar surface and a cylindrical surface. The sample holder 123 is configured to secure a translucent biological sample 124 immersed in a medium. The translucent biological specimen 124 is at least partially positioned within an imaging focal plane 125 provided by the imaging device 120. The imaging focal plane 125 is oriented such that a focused light beam 126 is a thin light sheet 127 as it passes through the translucent biological sample 124 within the imaging focal plane 125. Optionally, the fluid chamber can also include a second optical window 128 perpendicular to the positive cylindrical optical window 122 and aligned with the imaging device 120.

FIG. 19 shows a detailed illustration of the imaging system 30 for minimizing spherical aberrations in light-sheet microscopy. A light generation system 129 generates a collimated light beam 130 that is focused in the direction of the fluid chamber 121. The light generation system 129 can include a laser diode with an emitting layer and collimating lens. A lens 131, which can be either a cylindrical lens or an acylindrical lens, focuses the collimated light beam 130 into a focused light sheet 126. If the lens is a cylindrical lens then the cylindrical lens can be a single element lens or a compound lens. The focused light sheet 126 passes through the positive cylindrical optical window 122 of the fluid chamber 121 and is a thin light sheet 127 when it is located at least partially within the translucent biological sample 124. The fluid chamber 121 is positioned such that the imaging focal plane 125 of the imaging device 120, which is preferably a microscope, intersects the thin light sheet 127. The imaging device 120 captures data from the translucent biological sample 124 as the thin light sheet 127 scans across the imaging focal plane 125 and through at least a portion of the translucent biological sample 124. The data captured by the imaging device 120 can be displayed, post processed, and analyzed on a display (not shown) with a processor and non-transitory memory in wired or wireless connection with the imaging device 85 using imaging software (such as ImageJ).

The fluid chamber 121 can further comprise a second optical window 128 perpendicular to the axis of the cylindrical surface of the positive cylindrical optical window 122. The fluid chamber 121 can be positioned such that the imaging focal plane 125 of the imaging device 120 intersects the thin light sheet 127. The imaging focal plane 125 of the imaging device 120 can pass through the second optical window 128 to capture data from the translucent biological sample 124 when the thin light sheet 127 passes through the translucent biological sample 124.

The translucent biological sample 124 can be obtained from a specimen and then immersed in a medium. The translucent biological sample 124 can be an optically cleared tissue or a naturally translucent tissue. The translucent biological sample 124 immersed in the medium can placed within the fluid chamber 121 of a microscope and secured by a sample holder 127. Preferably, the translucent biological sample 124 can be aligned with the center of curvature of the positive cylindrical optical window 122. The translucent biological sample 124, the medium, and the positive cylindrical chamber 122 each have a refractive index between 1.33 and 1.55. Preferably, the refractive indexes are all within ±0.05 of each other. Exemplary materials with refractive indexes in this range include a silica optical window for a glycerol medium and a BK-7 optical window for an oil medium.

The optical axis of the lens 131, either cylindrical or acylindrical, is preferably aligned with the optical axis of the positive cylindrical optical window 122. The lens 131, cylindrical or acylindrical, can be moveable by an attached motor and translatable by a value between ±4% of the radius of a cylindrical surface of the positive cylindrical optical window 122. The positive cylindrical optical window 122 has a planar surface and a cylindrical surface. The cylindrical surface of the positive cylindrical optical window 122 faces the light generation system 130 and the planar surface faces towards the translucent biological sample 124. The distance between a focus of the lens 131, either a cylindrical lens or an acylindrical lens, and the axis of the cylindrical surface of the positive cylindrical optical window 122 is less than or equal to 4% of a radius of the cylindrical surface of the positive cylindrical optical window. The positive cylindrical optical window 122 can decrease the distance between the lens 131 and the translucent biological sample 124 by a factor of approximately 1.25. As such a smaller, less expensive light-sheet microscopy system with a better resolution is possible.

B. Method

Figure 20:
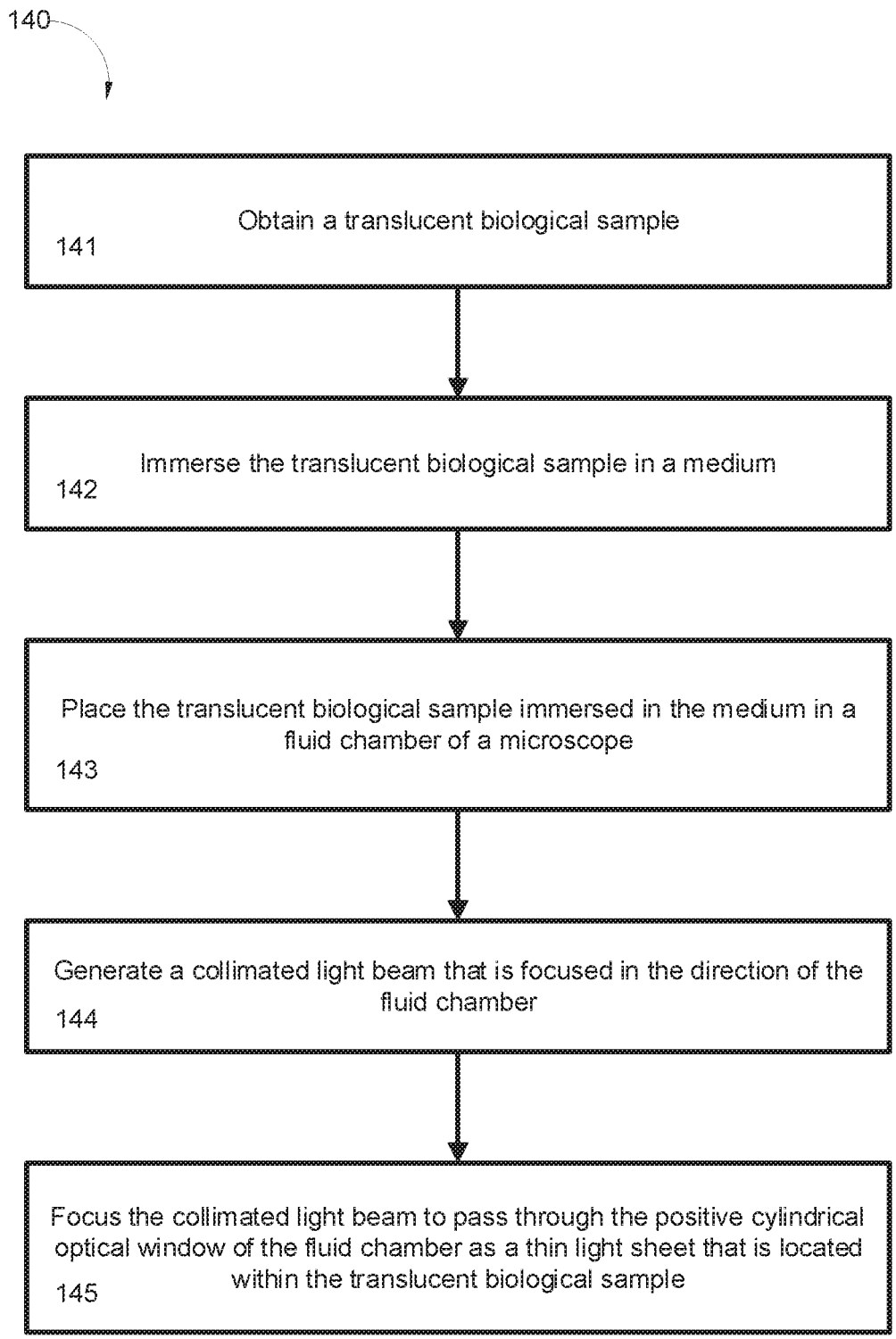
FIGS. 20 and 21 are process flow diagrams shown example methods of using the system of FIG. 18.
Figure 21:
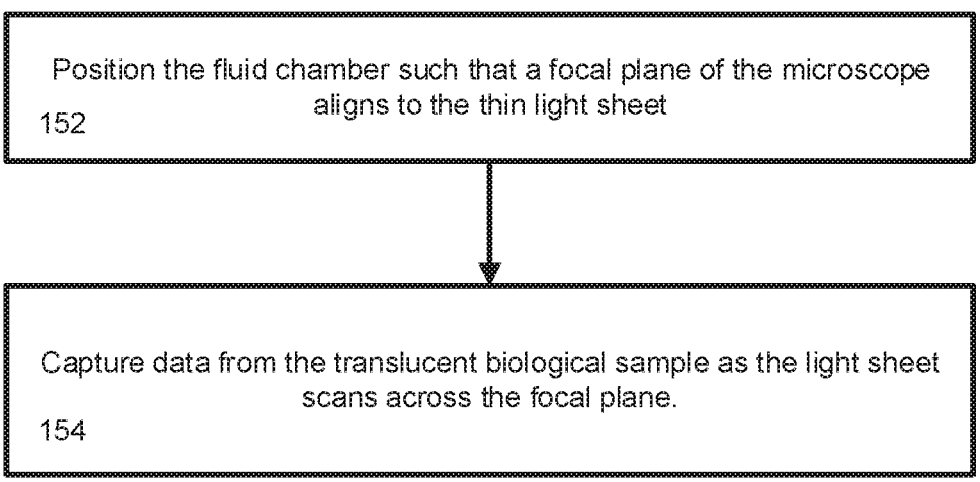

Another aspect of the present disclosure can include methods 140 and 150 as shown in FIGS. 20 and 21 for facilitating the high resolution imaging of a translucent biological sample. Methods 140 and 150 can be used to improve the images taken with light-sheet microscopy by cost-effectively removing spherical aberrations from a light-sheet microscopy system. The methods 140 and 150 can be performed by the system of FIG. 18 or FIG. 19, for example.

The methods 140 and 150 are illustrated as process flow diagrams with flowchart illustrations. For purposes of simplicity, the methods 140 and 150 are shown and described as being executed serially; however, it is to be understood and appreciated that the present disclosure is not limited by the illustrated order as some steps could occur in different orders and/or concurrently with other steps shown and described herein. Moreover, not all illustrated aspects may be required to implement the methods 140 and 150.

Referring now to FIG. 20, illustrated is a method 140 for setting up a light-sheet microscope with an improved imaging system 30 that can minimize spherical aberrations. At 141, a translucent biological sample is obtained, from a specimen or a repository. The translucent biological sample can be naturally translucent tissue, or the sample can be tissue that is optically cleared to make it translucent. At 142, the translucent biological sample is immersed in a medium. Both the translucent biological sample and the medium it is immersed have a refractive index between 1.33 and 1.55. Exemplary materials with refractive indexes in this range include a silica optical window for a glycerol medium and a BK-7 optical window for an oil medium. At 143, the translucent biological sample immersed in the medium is placed in a fluid chamber, preferably the fluid chamber is the fluid chamber of a microscope. The fluid chamber comprises a positive cylindrical optical window, which also has a refractive index between 1.33 and 1.55, and a sample holder configured to secure the translucent biological sample immersed in the medium. Preferably, the translucent biological sample, the medium, and the positive cylindrical optical window each have a refractive index within ±0.05 of each other. At 144, a collimated light beam is generated by a light generation system and the collimated light beam is focused in the directions of the fluid chamber. At 145, the collimated light beam is focused by a lens, either a cylindrical lens or an acylindrical lens, and passes through the positive cylindrical optical window and is a thin light sheet as it is located within the translucent biological sample. If the lens is a cylindrical lens, then the focusing lens can be a single element lens or a compound lens.

The optical axis of the lens, either cylindrical or acylindrical, can be aligned with the optical axis of the positive cylindrical optical window. Optionally, the lens, either cylindrical or acylindrical, can be attached to a motor, such as in the light focusing system 10, and can be translated by a value between ±4% of the radius of a cylindrical surface of the positive cylindrical optical window. The positive cylindrical optical window has a planar surface and the cylindrical surface. The cylindrical surface faces the light generation system and the planar surface faces towards the translucent biological sample. The positive cylindrical optical window removes spherical aberrations from images taken with a light-sheet microscopy system, when the light-sheet microscopy system uses higher numerical aperture lens. To accommodate for potential movement in the system the distance between a focus of the lens, cylindrical or acylindrical, and the axis of the cylindrical surface of the positive cylindrical optical window is less than or equal to 4% of a radius of the cylindrical surface of the positive cylindrical optical window. The fluid chamber where the translucent biological specimen immersed in medium is placed can optionally comprise a second optical window perpendicular to the axis of the cylindrical surface of the positive cylindrical optical window Referring now to FIG. 21, illustrated is the method 150 for imaging a translucent biological sample with light-sheet microscopy. At 152, the fluid chamber is positioned such that an imaging focal plane of an imaging device, preferably a microscope, intersects the thin light sheet. At 154, data is captured, by the imaging device that is preferably a microscope, from the translucent biological sample as the thin light sheet scan across at least a portion of the translucent biological sample in the imaging focal plane. The data captured by the imaging device that is preferably a microscope can also be displayed, post processed, and analyzed on a display with a processor and non-transitory memory in wired or wireless connection with the imaging device using imaging software (such as ImageJ).

Figure 22:
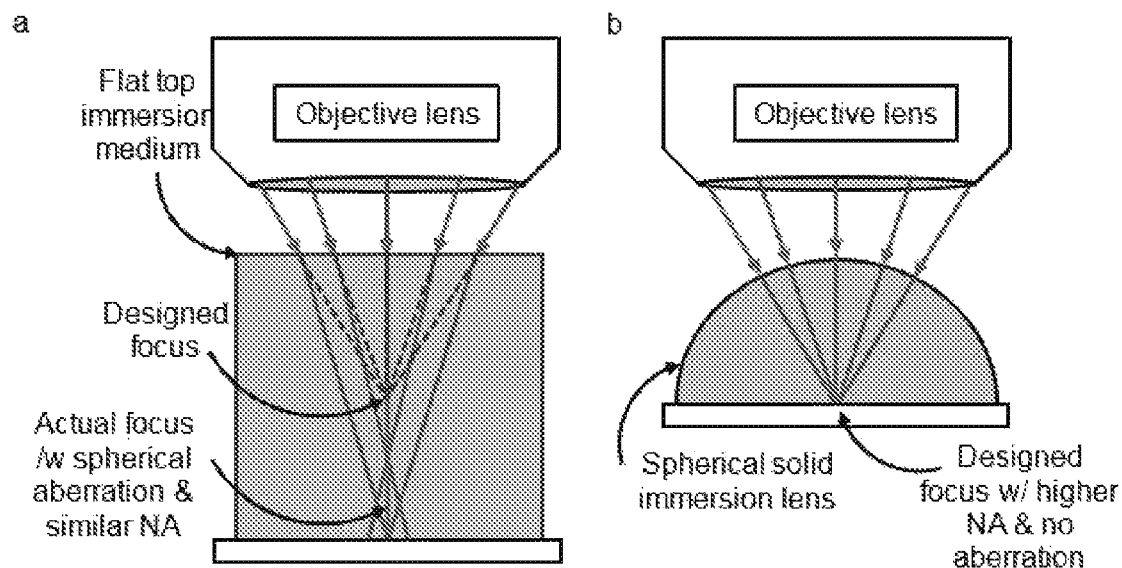
FIG. 22 is a diagram comparing the focus of a conventional light-sheet microscope objective with the focus of the system of FIG. 18.

FIG. 22 shows a comparison between the focuses of different objective types, flat top and spherical solid, with similar numerical apertures. Image a, on the left, shows compromised focusing deep into a sample, wherein the sample has a refractive index greater than one, using a conventional air objective. The system includes a flat top immersion medium with the designed focus shown in dotted line and the actual focus, with spherical aberrations, shown in full lines. Only a portion of the actual focus reaches an intended portion of the sample, leading to poor image resolution. Image b, on the right, shows a cylindrical solid immersion lens with a higher numerical aperture focusing using a conventional air objective. The designed focus, shown in full lines, reaches its full focal point at the intended portion of the sample and contains no optical aberrations.

Figure 23:
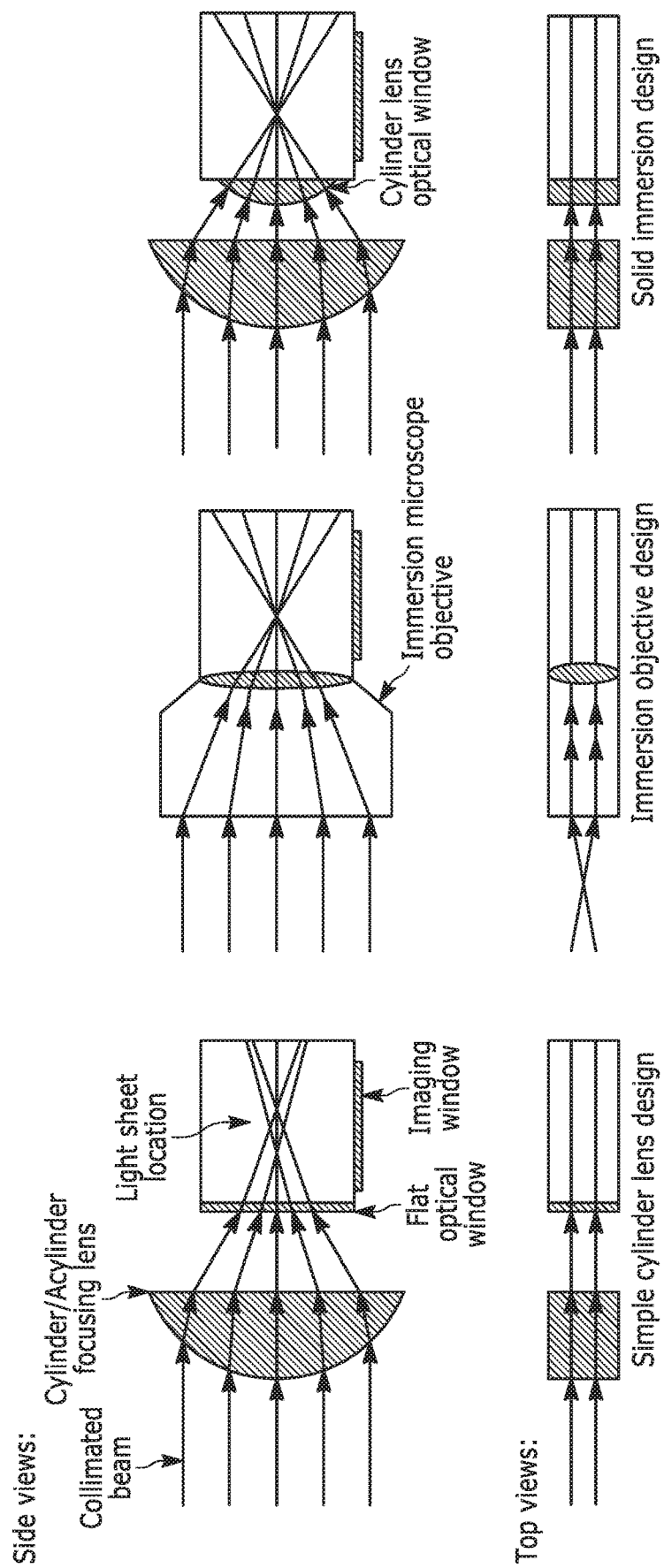
FIG. 23 is a diagram comparing the focuses of a conventional light-sheet microscopy objective, a fluid immersion objective, and the system of FIG. 18.

FIG. 23 shows further comparisons between light sheet illumination designs with different objectives and focuses. Both side and top views are shown. The left image shows direct focusing using a cylinder/acylinder lens to focus a light sheet into a sample chamber with a flat optical window. Rays show the spherical aberrations caused by this design; the spherical aberrations distort the focal point of the light sheet. The middle image shows focusing a light beam using an immersion objective. The input light beam needs to be preconfigured before it reaches the objective, which is not shown. The preconfiguring requirements of an immersion objective often require a multi-element optical system, which can be expensive and complex to operate. The image on the right shows focusing with the imaging system 30 using a cylindrical solid immersion (i.e., a positive cylindrical optical window). The cylindrical solid immersion removes the spherical aberrations seen in the direct focusing design in the left image and is significantly cheaper and simpler to build and operate than the immersion objective design in the middle image.

Figure 24:
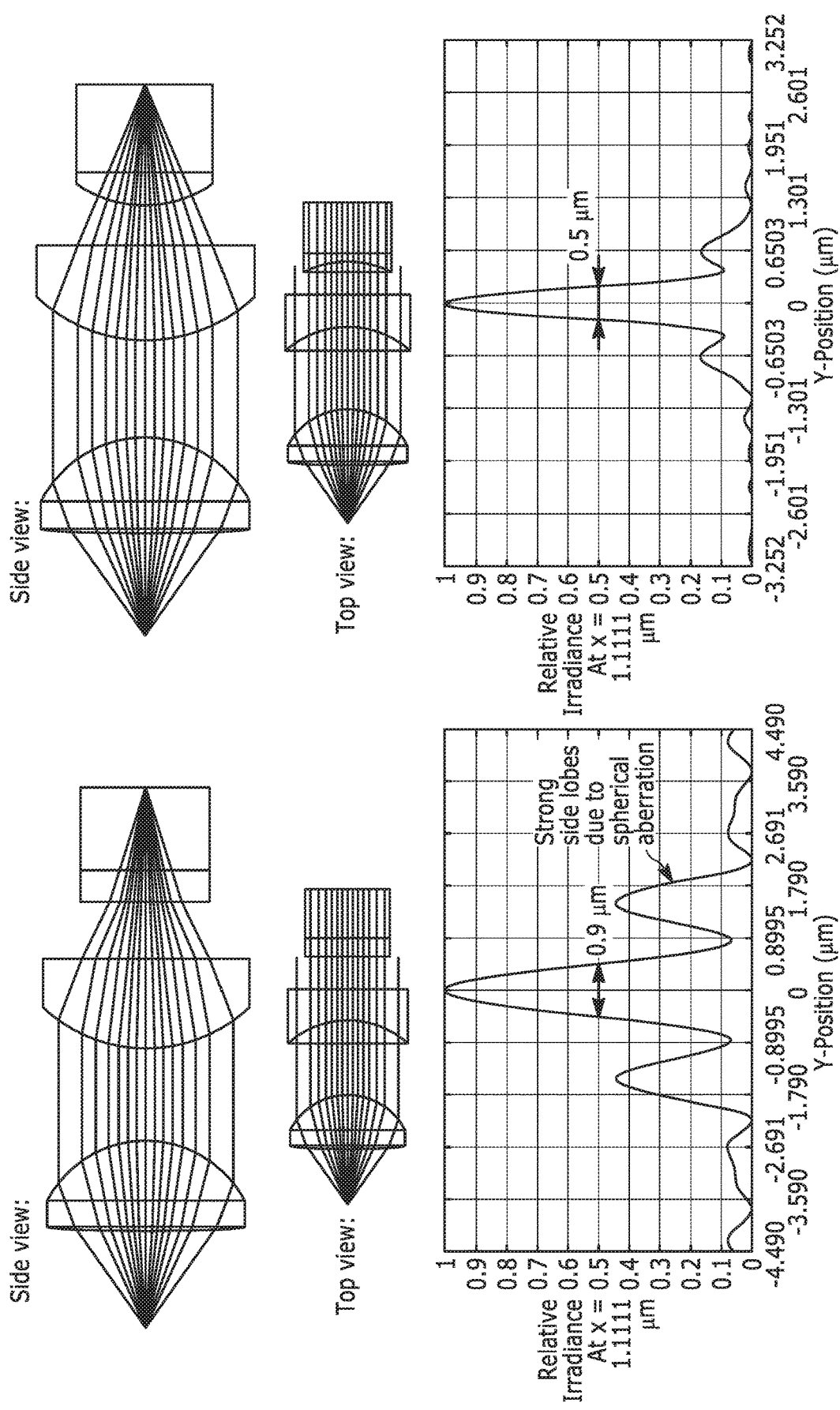
FIGS. 24 and 25 are diagrams and plots comparing the focus of a conventional light-sheet microscope objective and the focus of the system of FIG. 18.

FIG. 24 compares the optical layout and Huygens point spread function simulation (cross-section of focusing) when using a conventional flat optical window, on the left, and a positive cylindrical optical window, on the right. Both optical designs use a high numerical aperture acylindrical lens (NA=0.5) to focus a collimated light beam into a light sheet. The top left image shows the optical layout of the conventional design of a light-sheet microscope with the flat optical window. Both the side view and the top view are shown. The bottom left image shows the Huygens point spread function simulation of the conventional design. The local full width at half maximum at the focal line is 0.9 μm and strong side lobes occur due to spherical aberration. The top right image shows the optical layout of the cylindrical solid immersion (i.e., positive cylindrical optical window) design. Both the side view and the top view are shown. The bottom right image shows the Huygens point spread function simulation of the cylindrical solid immersion design.

The local full width at half maximum at the focal line is 0.5 µm and there are no significant side lobes because this design minimizes spherical aberrations when a high numerical aperture lens is used.

Figure 25:
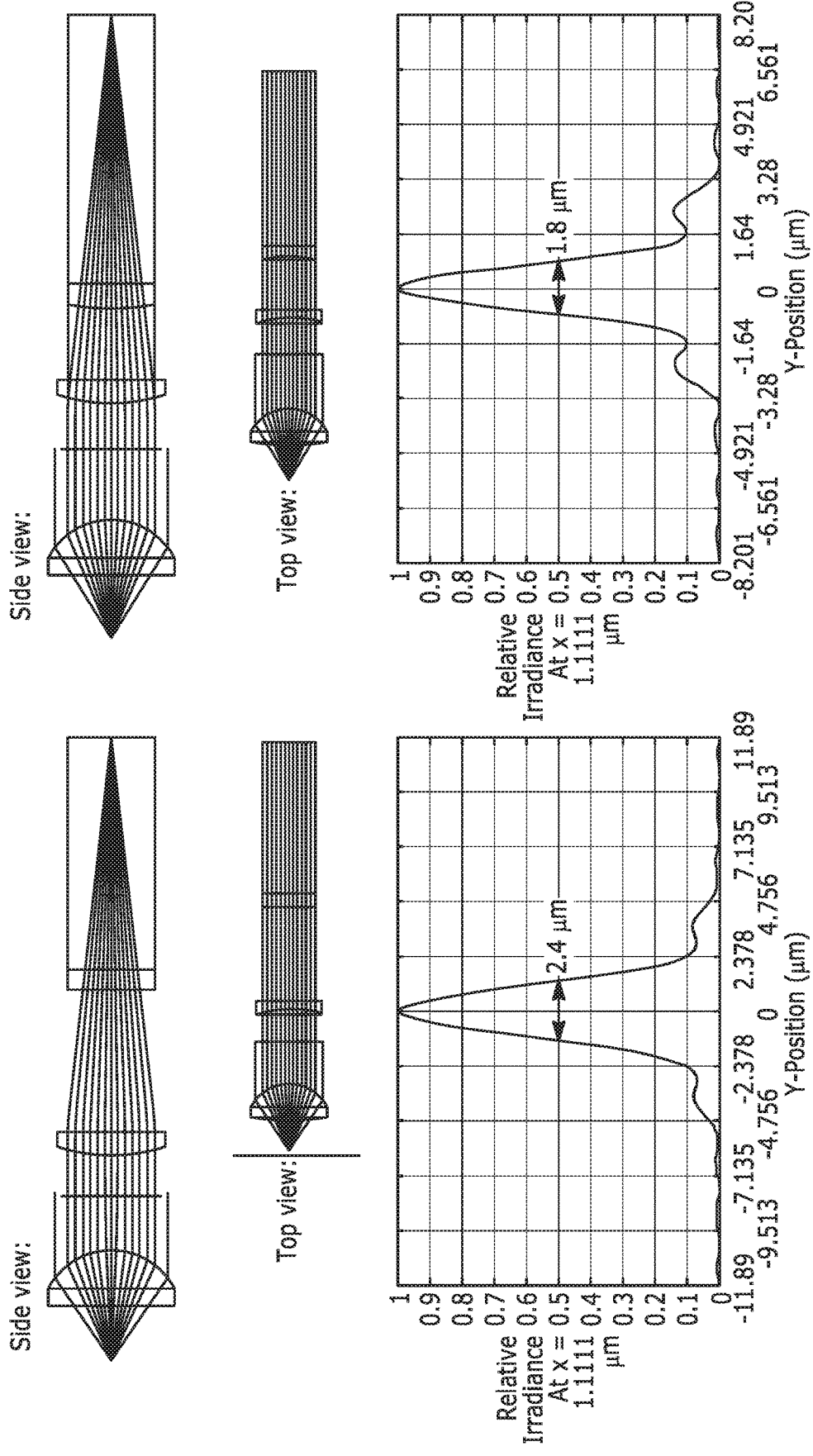

FIG. 25 shows the same comparison between the optical layouts and Huygens point spread function simulation (cross-section of focusing) when using a conventional flat optical window, shown on the left, and a positive cylindrical optical window, shown on the right. Both optical designs in FIG. 25 utilize a low numerical aperture cylindrical lens (NA=0.13) to focus a collimated light beam into a thicker light sheet than the designs in FIG. 24. The top left image shows the optical layout of the conventional design of a light-sheet microscope with the flat optical window. Both the side view and the top view are shown. The bottom left image shows the Huygens point spread function simulation of the conventional design. The local full width at half maximum at the focal line is 2.4 µm, with no distinct side lobes because there is little spherical aberration with a low numerical aperture lens. The top right image shows the optical layout of the cylindrical solid immersion (i.e., positive cylindrical optical window) design. Both the side view and the top view are shown. The bottom right image shows the Huygens point spread function simulation of the cylindrical solid immersion design. The local full width at half maximum at the focal line is 1.8 µm still with no significant side lobes. While spherical aberration differences are not significant in these designs, the cylindrical solid immersion design allows the distance between the focusing lens and the sample to be shorter. The distance between the focusing lens and the sample can be decreased by a factor of approximately 1.25. A shorter focusing distance can mean a more compact light-sheet microscope.

Figure 26:
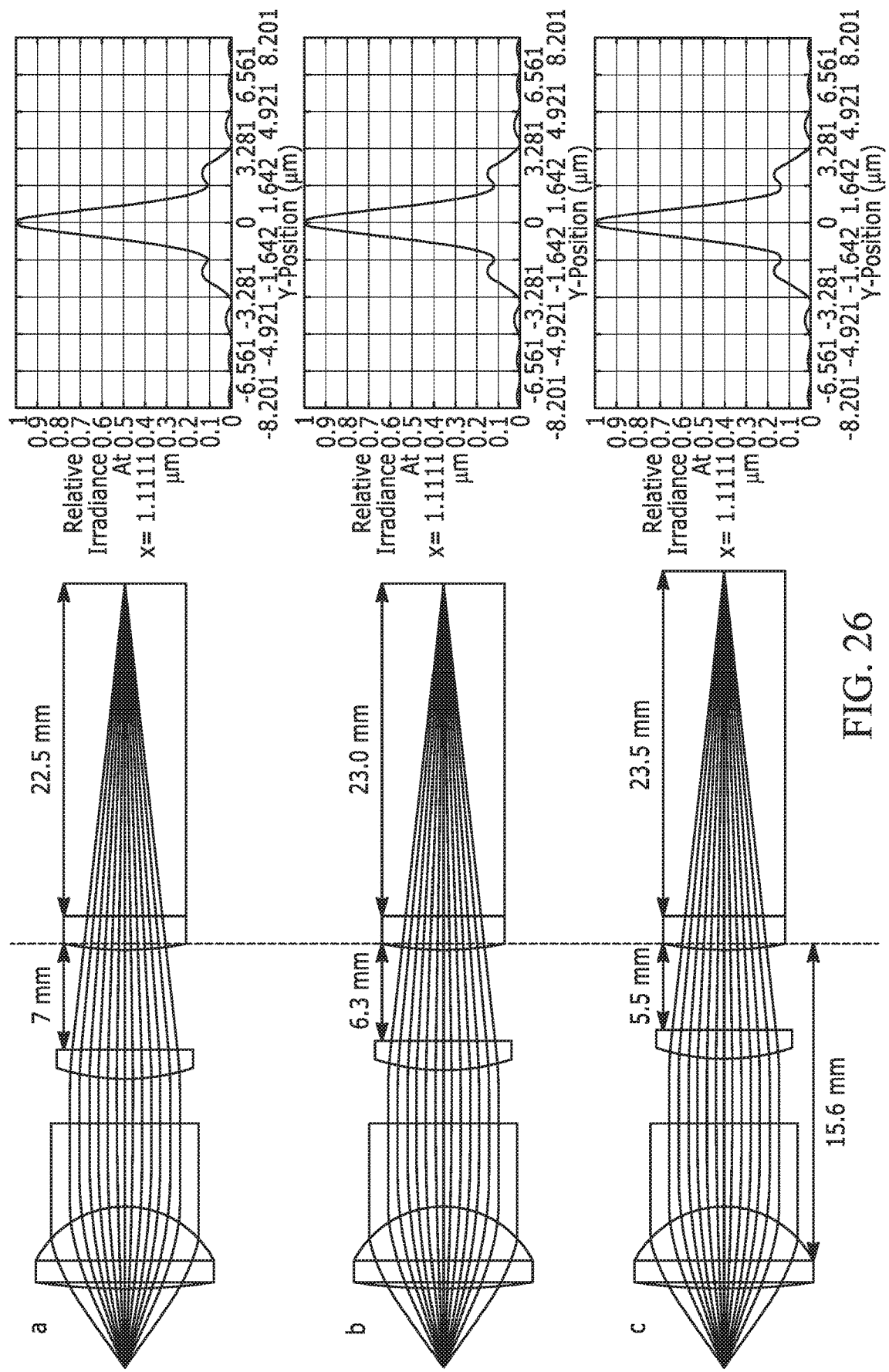
FIG. 26 includes diagrams and plots comparing the focus of the system of FIG. 18 when the distance between components is changed.

FIG. 26 shows comparisons between optical layouts, on the left, and Huygens point spread functions, on the right, for cylindrical solid immersion (i.e., positive cylindrical optical window) designs with minimal changes to the location of the focal points along the optical axis. Image a, on the top, shows the distance between the focusing lens and the cylindrical solid immersion is 7 mm and focal point distance is 22.5 mm into the fluid chamber. Image b, in the middle, shows the distance between the focusing lens and the cylindrical solid immersion is 6.3 mm and the focal distance is 23.0 mm in the fluid chamber. Image c, on the bottom, shows the distance between the focusing lens and the cylindrical solid immersion is 5.5 mm and the focal distance is 23.5 mm in the fluid chamber. The Huygens point spread functions of each design show minimal changes despite the change in distance between the focusing lens and the cylindrical solid immersion. Therefore, the cylindrical solid immersion design is robust enough for an amount of movement to occur in the system, the movement can be accidental or on purpose (i.e., using the light focusing system 10).

Using an imaging system 10 with a fluid chamber having a positive cylindrical optical window minimizes spherical aberrations that affect the focus of a light-sheet microscope using a high numerical aperture lens. The imaging system 10 is a cost effective and simple solution for attaining better resolution images with light-sheet microscopy. The imaging system 10 also decreases the distance needed between a focusing element and a sample, allowing a light sheet microscopy system to be smaller.

V. Combination of Improvements 10, 20, and/or 30

Each of the aspects of this disclosure (light focusing system 10, light generation system 20, and/or imaging system 30) can stand alone or can be combined in any combination with at least one of each other.

Figure 27:
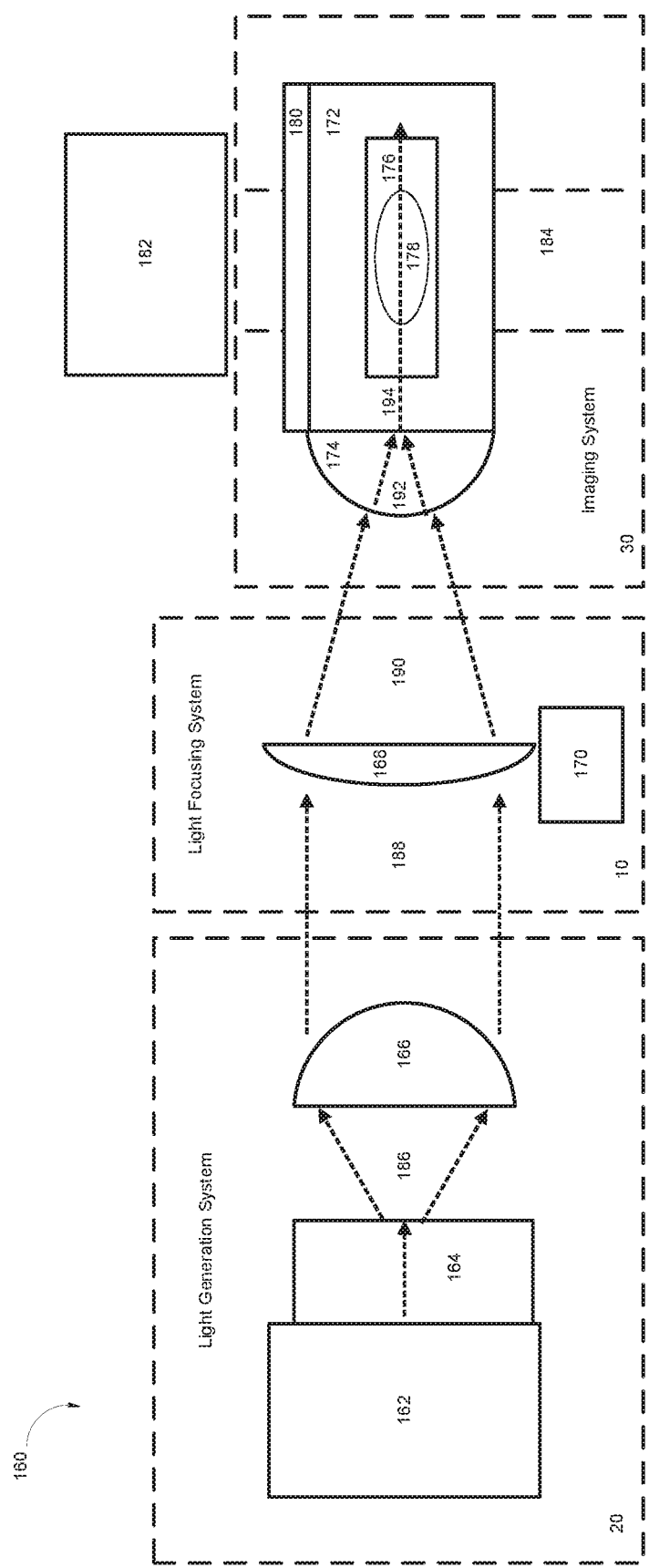
FIG. 27 is a detailed diagram of an example of the system shown in FIG. 1 that can be used for improved light-sheet microscopy.

FIG. 27 shows the full combination 160 of the light focusing system 10, the light generation system 20, and the imaging system 30. The multimode laser diode 162 with emitting layer 164 provides light beam 186. Collimating lens 166 collimates the light beam 186. The lens 168, cylindrical or acylindrical, mounted on VCM 170 focuses the collimated light beam into a focal sheet 190 towards the fluid chamber 172. The fluid chamber comprises a positive cylindrical optical window 174 and a sample holder 176 that secures a sample 178 (immersed in a medium) in the fluid chamber 172. The focal sheet 190 passes through the positive cylindrical optical window 174 of the fluid chamber 172 and into the sample 178 as a thin light sheet. The fluid chamber 172 can also comprise a second optical window 180 facing the imaging device 182, which may be a microscope. The imaging device 182 provides an imaging focal plane 184. The sample 178 is at least partially within the imaging focal plane 184. The imaging device 182 captures data from the at least the portion of the sample 178 in the imaging focal plane 184 when the thin light sheet 194 passes through the same at least the portion of the sample 178 in the imaging focal plane 184. The captured data can be displayed, post-processed, and analyzed on a display (not shown) with a processor and non-transitory memory in wired or wireless connection with the imaging device 182 using imaging software, such as ImageJ.

By combining each of the system improvements together a light-sheet microscope with each system's benefits can be produced. The full combination 160 can have the higher optical power and uniform beam intensity of the light generation system 20, the extended focal plane of light focusing system 10, and the improved imaging resolution (with minimized spherical aberrations) of imaging system 30. The methods of using each of the improved systems, described previously, can also be combined into a method of using the full combination 160.

From the above description, those skilled in the art will perceive improvements, changes and modifications. Such improvements, changes and modifications are within the skill of one in the art and are intended to be covered by the appended claims. All patents, patent applications, and publications cited herein are incorporated by reference in their entirety.

What is claimed is:

1. A system that facilitates light-sheet microscopy comprising:
   a light generation system consisting essentially of:
      a multimode laser diode configured to output a light beam with a high order Hermite-Gaussian mode, wherein a Hermite polynomial of a Gaussian function of a beam profile of the light beam has a Hermite-Gaussian index equal to zero in one dimension and greater than zero in another dimension, wherein the one dimension with the index equal to zero has a higher output divergence than the other dimension;
      a collimating lens configured to collimate the light beam;
   a light focusing system comprising:
      a focusing lens configured to focus the collimated light beam into a focal sheet within a focal plane of an imaging device by achieving a wide and flat beam profile at a center of the light beam corresponding to a field of view, wherein the focal sheet is a light sheet, wherein the focusing lens is configured to focus the light beam in the one dimension that the Hermite-Gaussian index equal to zero has a higher output divergence, wherein the focusing lens is a cylindrical lens or an acylindrical lens; and a voice coil motor (VCM) attached to the focusing lens and configured to move the focusing lens along an axis of the light beam by vibrating at a rate of 10 Hz to 100 Hz, causing a change in a position of the light sheet within the focal plane of the imaging device; and a fluid chamber configured to immerse a sample in a medium and configured to receive a focused and collimated light beam, the fluid chamber comprising:
a sample holder configured to secure the sample immersed in the medium in the fluid chamber; and
a positive cylindrical optical window attached directly to an outside of the fluid chamber, wherein the distance between the sample and the focusing lens is reduced by a factor of 1.25 compared to traditional light sheet microscopy.

2. The system of claim 1, wherein the focusing lens is a single element lens or a compound lens.

3. The system of claim 1, wherein the light generation system is configured to generate the light beam with a wavelength from 350 nm to 1800 nm.

4. The system of claim 1, wherein the VCM has a travel range from 100 μm to 7 mm.

5. The system of claim 1, wherein the imaging device is configured to capture data when the light sheet passes through the sample in the imaging focal plane.

6. The system of claim 1, where the imaging device further comprises:
a compound objective lens oriented such that the focal plane of the compound objective lens is orthogonal to the light sheet;
an optical filter;
a tube lens; and
an image sensor configured to capture the data when the light sheet passes through the sample in the imaging focal plane.

7. The system of claim 6, wherein the image sensor is a CCD camera or a CMOS camera.

8. The system of claim 6, wherein the image sensor has a rolling shutter.

9. The system of claim 1, wherein the imaging device is a microscope.

10. The system of claim 1, wherein the multimode laser diode has an emission wavelength range from 350 nm to 1800 nm.

11. The system of claim 1, wherein the collimating lens is a single aspherical lens, a spherical achromatic doublet, or a compound lens.

12. The system of claim 1, wherein an optical axis of at least two of: the multimode laser diode, the collimating lens, and the focusing lens are configured to align.

13. The system of claim 1, wherein a surface of the lens is parallel to an emitting layer of the multimode laser diode.

14. A method comprising:
obtaining a translucent biological sample;
immersing the translucent biological sample in a medium;
placing the translucent biological sample immersed in the medium within in a fluid chamber of a microscope, the fluid chamber comprising:
a positive cylindrical optical window attached directly to an outside of the fluid chamber, and
a sample holder configured to secure the translucent biological sample immersed in the medium in the fluid chamber;
generating, by a light generation system, a collimated light beam that is focused in a direction of the fluid chamber, wherein the light generation system comprises:
a multimode laser diode configured to output a light beam with a high order Hermite-Gaussian mode, wherein a Hermite polynomial of a Gaussian function of a beam profile of the light beam has an index equal to zero in one dimension and greater than zero in another dimension, wherein the one dimension with the index equal to zero has a higher output divergence than the other dimension, and
a collimating lens configured to collimate the light beam; and
focusing, by a cylindrical lens or an acylindrical lens, the collimated light beam in the one dimension to pass through the positive cylindrical optical window as a thin light sheet that is located within the translucent biological sample, wherein the cylindrical lens or the acylindrical lens focuses the collimated light beam into a focal sheet within a focal plane of an imaging device by achieving a wide and flat beam profile at a center of the light beam corresponding to a field of view, wherein the focal sheet is a light sheet,
wherein the thin light sheet passing through the positive cylindrical optical window minimizes spherical aberrations, and
wherein the distance between the sample and the cylindrical lens or the acylindrical lens is reduced by a factor of 1.25 compared to traditional light sheet microscopy.

15. The method of claim 14, wherein the translucent biological sample is an optical cleared tissue or a naturally translucent tissue.

16. The method of claim 14, wherein the translucent biological sample, the medium, and the positive cylindrical chamber each have refractive indices between 1.33 and 1.55.

17. The method of claim 14, wherein the cylindrical lens is a single element lens or a compound lens.

18. The method of claim 14, wherein the optical axis of the cylindrical lens or the acylindrical lens aligns with the optical axis of the positive cylindrical optical window.

19. The method of claim 14, wherein the cylindrical lens or the acylindrical lens is moveable by a motor and translatable by a value between ±4% of the radius of a cylindrical surface of the positive cylindrical optical window.

20. The method of claim 14, wherein the positive cylindrical optical window has a planar surface and a cylindrical surface.

21. The method of claim 20, wherein the cylindrical surface of the positive cylindrical optical window faces the light generation system and the planar surface faces towards the translucent biological sample.

22. The method of claim 20, wherein a distance between a focus of the cylindrical lens or the acylindrical lens and the axis of the cylindrical surface of the positive cylindrical optical window is less than or equal to 4% of a radius of the cylindrical surface of the positive cylindrical optical window.

23. The method of claim 20, wherein the fluid chamber further comprises a second optical window perpendicular to the axis of the cylindrical surface of the positive cylindrical optical window.

24. The method of claim 14, further comprising:
  positioning the fluid chamber such that the focal plane of the microscope aligns to the thin light sheet; and
  capturing, by the microscope, data from the translucent biological sample as the thin light sheet scans across the focal plane.

\* \* \* \* \*

UNITED STATES PATENT AND TRADEMARK OFFICE
CERTIFICATE OF CORRECTION

| | | |
|---|---|---|
| PATENT NO. | : 12,253,469 B2 | Page 1 of 1 |
| APPLICATION NO. | : 17/626328 | |
| DATED | : March 18, 2025 | |
| INVENTOR(S) | : Yehe Liu | |

It is certified that error appears in the above-identified patent and that said Letters Patent is hereby corrected as shown below:

In the Specification

Column 1, before the heading TECHNICAL FIELD add the following heading and language:
-- GOVERNMENT FUNDING
This invention was made with government support under OD025307 awarded by the National Institutes of Health. The government has certain rights in the invention. --

Signed and Sealed this
Twenty-first Day of October, 2025

John A. Squires
*Director of the United States Patent and Trademark Office*